(12) United States Patent
Tokuma

(10) Patent No.: US 11,427,422 B2
(45) Date of Patent: Aug. 30, 2022

(54) MEASUREMENT APPARATUS AND IMAGE FORMING APPARATUS

(71) Applicant: CANON KABUSHIKI KAISHA, Tokyo (JP)

(72) Inventor: Naoto Tokuma, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/091,586

(22) Filed: Nov. 6, 2020

(65) Prior Publication Data

US 2021/0139262 A1   May 13, 2021

(30) Foreign Application Priority Data

Nov. 12, 2019   (JP) .............................. JP2019-204660

(51) Int. Cl.
| | |
|---|---|
| *B65H 7/14* | (2006.01) |
| *B65H 5/06* | (2006.01) |
| *G01N 21/25* | (2006.01) |
| *G03G 15/00* | (2006.01) |

(52) U.S. Cl.
CPC .............. *B65H 7/14* (2013.01); *B65H 5/062* (2013.01); *G01N 21/255* (2013.01); *G03G 15/5062* (2013.01); *G03G 15/6573* (2013.01)

(58) Field of Classification Search
CPC ................... B41J 2203/01; H04N 2201/02404
See application file for complete search history.

(56) References Cited

U.S. PATENT DOCUMENTS

| | | | | |
|---|---|---|---|---|
| 5,308,173 | A * | 5/1994 | Amano ..................... | B41J 3/36 400/193 |
| 6,000,776 | A * | 12/1999 | Suzuki ................... | B41J 2/2139 347/14 |
| 7,827,908 | B1 * | 11/2010 | Leon ...................... | B41J 25/312 101/41 |

(Continued)

FOREIGN PATENT DOCUMENTS

| | | | | |
|---|---|---|---|---|
| EP | E P-1030513 A2 | * | 8/2000 | ........... H04N 1/6033 |
| EP | 3383015 A1 | * | 10/2018 | ......... H04N 1/00013 |

(Continued)

*Primary Examiner* — Jennifer Bahls
(74) *Attorney, Agent, or Firm* — Venable LLP

(57) ABSTRACT

A measurement apparatus including: a conveyance unit configured to convey a sheet in a conveyance direction; a measurement portion configured to measure an image formed on the sheet; a first movement unit configured to move the measurement portion in a predetermined direction orthogonal to the conveyance direction; a second movement unit configured to move the measurement portion to a first position and a second position farther apart from the sheet than the first position; and a first abutment member, a second abutment member, a third abutment member, and a fourth abutment member, which abut against the sheet when the measurement portion is located at the first position. When the measurement portion is moved from the second position to the first position, the third abutment member and the fourth abutment member are brought into abutment against the sheet earlier than the first abutment member and the second abutment member.

19 Claims, 14 Drawing Sheets

(56) References Cited

U.S. PATENT DOCUMENTS

| | | | |
|---|---|---|---|
| 2009/0244652 A1* | 10/2009 | Osakabe | H04N 1/1017 |
| | | | 358/474 |
| 2013/0135650 A1* | 5/2013 | Kuronuma | H04N 1/00015 |
| | | | 358/1.13 |
| 2014/0185114 A1* | 7/2014 | Takemura | H04N 1/00045 |
| | | | 358/504 |
| 2020/0218187 A1 | 7/2020 | Takahashi | |

FOREIGN PATENT DOCUMENTS

| JP | 2009-53346 A | | 3/2009 |
|---|---|---|---|
| JP | 2013-54324 A | | 3/2013 |
| JP | 2015210436 A | * | 11/2015 |
| JP | 2019198089 A | * | 11/2019 |

\* cited by examiner

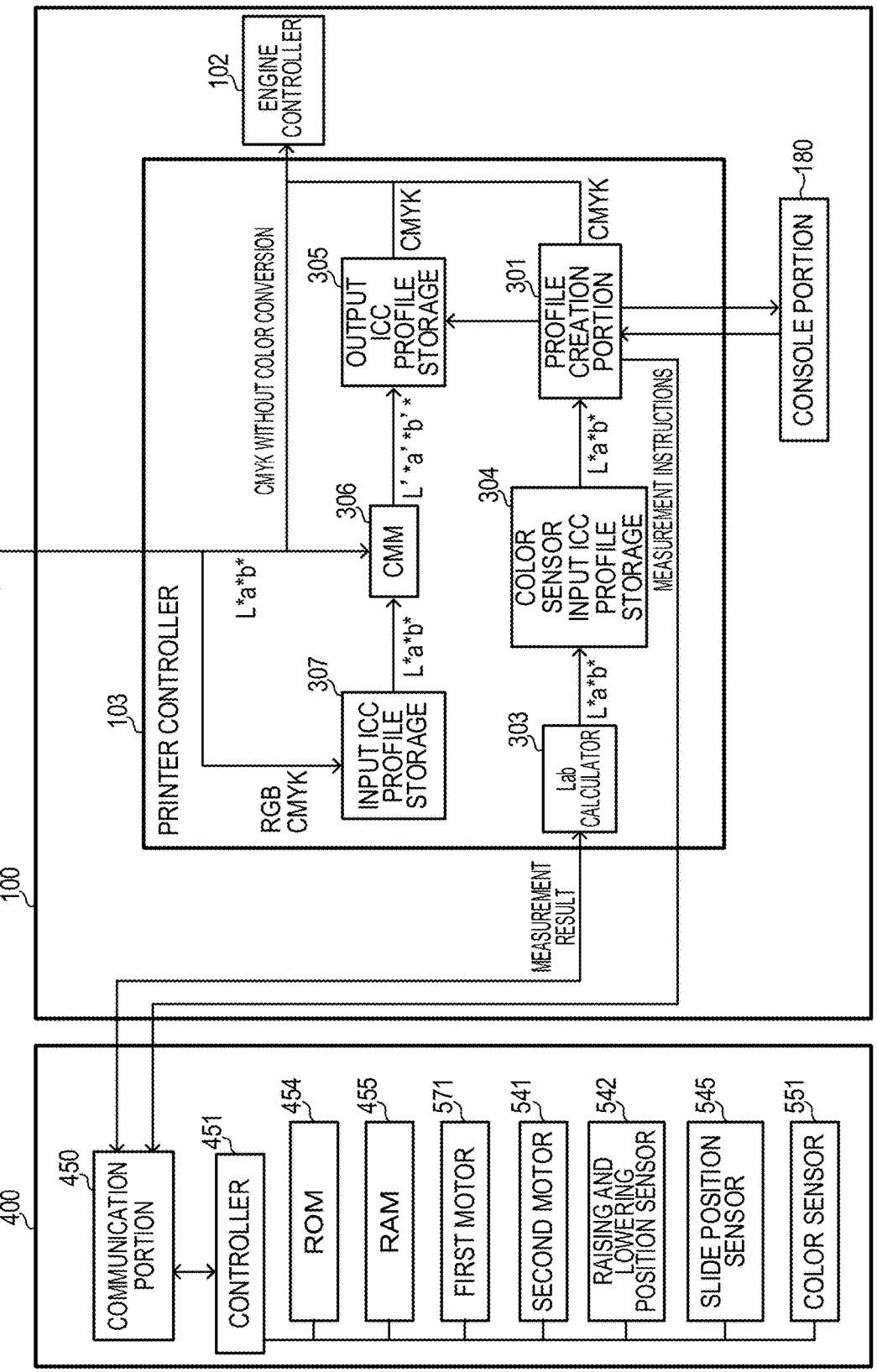

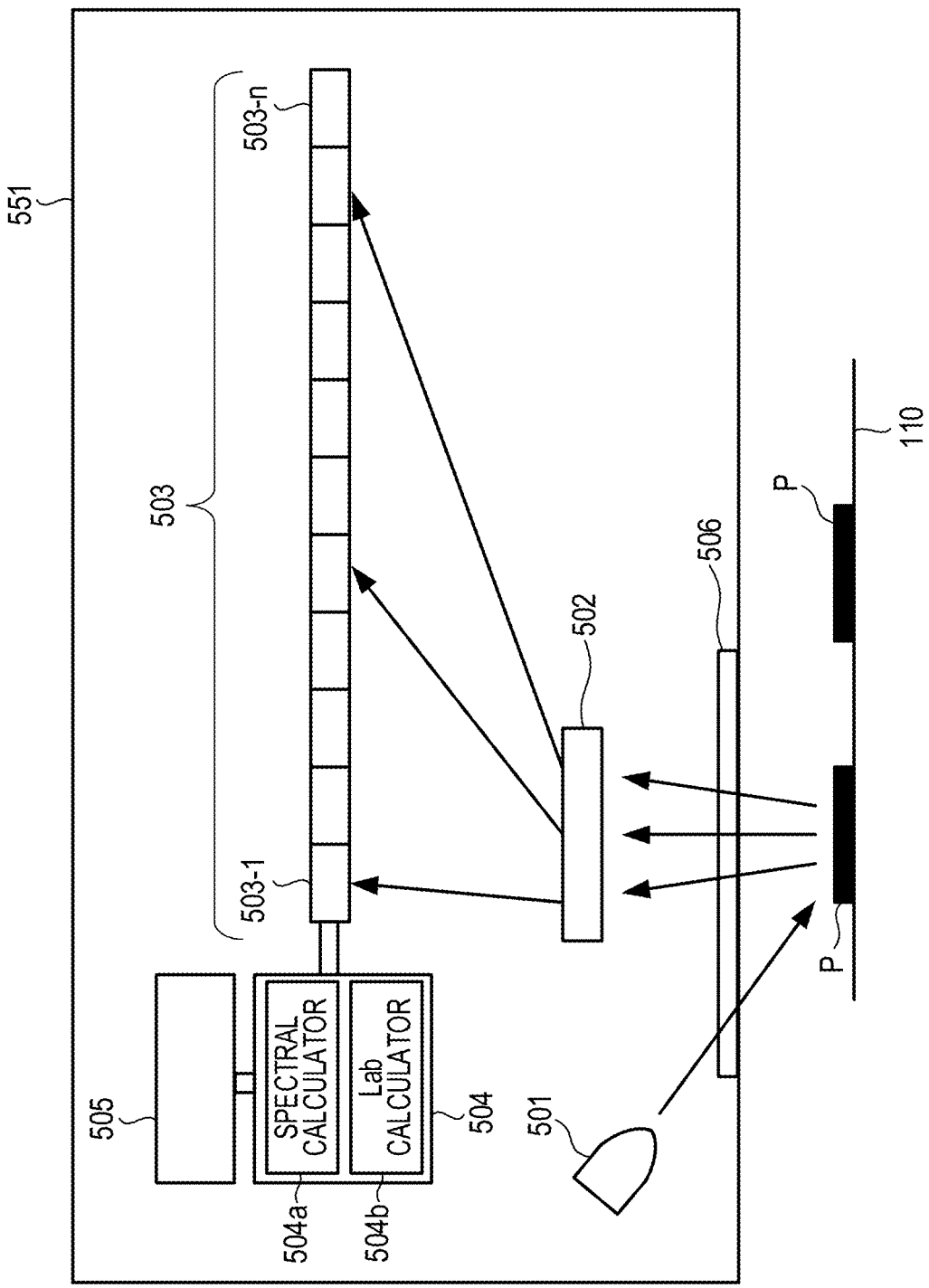

FIG. 5

Header:

size: 270176 bytes  
CMMType: 'appl'  
version: 0x02002001  
profileClose: 'prtr'  
dataColorSpace: 'CMYK'  
InterchangeSpace: 'XYZ'  
CreationDate: 3.4. 1996, 19:46:14  
CS23ignatre: 'acsp' prim.platform: 'APPL'  
flags: 0x00000000  
deviceManufacturer: 'EF1'  
deviceModel: 0  
deviceAttributes: 0x00000000, 0x00000000  
renderingIntent: 2  
white XYZ: X=0.9642, V=1.0000, Z=0.8249

Tag Table: <10 elements, double-click to inspect>

| Ind | Signet. | elementoffset | size |
|---|---|---|---|
| 0 | 'A2B0' | 252 = 0x000000FC | 43002 |
| 1 | 'B2A0' | 43256 = 0x000DA8F8 | 42940 |
| 2 | 'A2B1' | 86196 = 0x00015084 | 43002 |
| 3 | 'B2A1' | 12920D = 0x0001F880 | 42940 |
| 4 | 'A2B2' | 17214D = 0x0002A06C | 43002 |
| 5 | 'B2A2' | 215144 = 0x00034868 | 42940 |
| 6 | 'gamt' | 258084 = 0x0003F024 | 11925 |
| 7 | 'desc' | 270012 = 0x00041EBC | 125 |
| 8 | 'cprt' | 27014D = 0x00041F3C | 14 |
| 9 | 'wtpt' | 270156 = 0x00041F4C | 20 |
| | | | |
| | | | |
| | | | |
| | | | |
| | | | |

MEASUREMENT APPARATUS AND IMAGE FORMING APPARATUS

BACKGROUND OF THE INVENTION

Field of the Invention

The present invention relates to a measurement apparatus configured to measure an image formed on a sheet, and an image forming apparatus.

Description of the Related Art

Nowadays, the market of on-demand printers has been expanding. In particular, electrophotographic on-demand printers and inkjet on-demand printers are spreading in the offset print market. However, new printers to enter the market are required to achieve the same image quality as that has been achieved by previous offset printers having dominated the market. The image quality includes, for example, granularity, in-plane uniformity, letter quality, and color reproducibility (including color stability). However, it is said that the most important image quality is the color reproducibility.

Humans have the memory of colors expected based on experiences (in particular, colors of human skin, a blue sky, and metals). The colors memorized by humans as images are called "memory colors". When a color of an image formed by a printer does not fall within an acceptable range of the memory color, humans feel uncomfortable. Thus, the color of the image formed by the printer is often adjusted to the memory color. Some Office users feel uncomfortable not only in difference of color of an Office-based document from the memory color but also in difference of color from a color on a monitor. Further, some graphic arts users pursue the color reproducibility of computer graphics (CG) images. As described above, the degree of demand for the color reproducibility (including the color stability) is increasing for the on-demand printers.

As for the color reproducibility, a difference in color not only between apparatus of the same model but also between apparatus of different models or from a printer or an image display apparatus using another method becomes a problem. Thus, a color sensor configured to detect colors of an image and software configured to create a multi-dimensional lookup table (LUT) called an International Color Consortium (ICC) profile are used to perform color matching between the apparatus. With use of the ICC profile, colors output from a printer can be matched with colors printed by the offset printing machine. Thus, the printer is used for color proof of the offset printing machine or as a production good for a small number of copies.

In a case of color management using an offline color sensor, however, measurement takes a long time. Thus, the creation of the ICC profile is not easy. Further, work of uploading the created ICC profile to a controller for the printer and effectively using the uploaded ICC profile is not widely used by general users as expected. Thus, there has been proposed a printer including a color sensor mounted inline in the vicinity of a discharge portion configured to discharge a sheet on which an image is formed. With the color sensor, the printer performs measurement more rapidly, easily creates the ICC profile, and automates setting work. In Japanese Patent Application Laid-Open No. 2009-53346 and Japanese Patent Application Laid-Open No. 2013-54324, there is disclosed a printer including a color sensor mounted inline, in which measurement accuracy of the color sensor configured to detect patch images formed on a sheet is improved.

A color sensor disclosed in Japanese Patent Application Laid-Open No. 2013-54324 is fixed to the printer, and measures the patch images arranged in a conveyance direction of the sheet. Because the color sensor is fixed to the printer, the color sensor cannot measure the patch images arranged in a main scanning direction orthogonal to the conveyance direction of the sheet. Specifically, the number of patch images arranged on one sheet is small. Thus, the number of sheets needed for the color management is increased.

Thus, a movable color sensor is disclosed in Japanese Patent Application Laid-Open No. 2009-53346. The color sensor is moved in the main scanning direction so that the number of patch images arranged on one sheet is increased. In this manner, the number of sheets needed for the color management can be reduced. Further, a method of moving the color sensor in the main scanning direction is desirable also in that colors of a whole area of the sheet in the main scanning direction are detected to enable improvement of image uniformity.

However, when the color sensor is moved, a distance between the color sensor and the sheet sometimes changes. When the color sensor is an inexpensive spectral reflectometer, a depth of focus of the color sensor is small. Thus, when the distance between the color sensor and the sheet changes, color matching accuracy is reduced. In order to solve this problem, it is conceivable to use a spectral colorimeter having a large depth of focus. However, there arises a problem in that the spectral colorimeter having a large depth of focus is expensive. Further, it is also conceivable to use a CCD having a large depth of focus as the color sensor. However, measurement accuracy of the CCD is lower than that of the spectral colorimeter, and hence the color matching accuracy is reduced. As described above, the measurement of colors simultaneous with the movement of the color sensor in the main scanning direction and the use of an inexpensive color sensor having a small depth of focus have a trade-off relationship.

SUMMARY OF THE INVENTION

According to one embodiment of the present invention, there is provided a measurement apparatus including: a conveyance unit configured to convey a sheet, on which an image is formed, in a conveyance direction; a measurement portion which includes a light receiving portion configured to receive reflected light from the image formed on the sheet, and is configured to measure the image based on a result of light reception by the light receiving portion; a first movement unit configured to move the measurement portion in a predetermined direction orthogonal to the conveyance direction; a second movement unit configured to move the measurement portion to a first position and a second position farther apart from the sheet than the first position; a first abutment member configured to abut against the sheet when the measurement portion is located at the first position; a second abutment member which is provided at a position different from a position of the first abutment member in the conveyance direction, and is configured to abut against the sheet when the measurement portion is located at the first position; a third abutment member configured to abut against the sheet when the measurement portion is located at the first position; and a fourth abutment member which is provided at a position different from a position of the third abutment member in the predetermined direction, and is configured to abut against the sheet when the measurement portion is located at the first position, wherein an area in which the light receiving portion is provided in the conveyance direction is located between an area in which the first abutment member is provided and an area in which the second abutment member is provided in the conveyance direction, wherein an area in which the light receiving portion is provided in the predetermined direction is located between an area in which the third abutment member is provided and an area in which the fourth abutment member is provided in the predetermined direction, wherein the area in which the light receiving portion is provided in the conveyance direction overlaps with an area in which the third abutment member is provided in the conveyance direction, wherein the area in which the light receiving portion is provided in the conveyance direction overlaps with an area in which the fourth abutment member is provided in the conveyance direction, wherein, when the measurement portion is moved from the second position to the first position by the second movement unit, the third abutment member and the fourth abutment member are brought into abutment against the sheet earlier than the first abutment member, and wherein, when the measurement portion is moved from the second position to the first position by the second movement unit, the third abutment member and the fourth abutment member are brought into abutment against the sheet earlier than the second abutment member.

Further features of the present invention will become apparent from the following description of exemplary embodiments with reference to the attached drawings.

BRIEF DESCRIPTION OF THE DRAWINGS

FIG. 3 is a block diagram for illustrating a control system of a printer and the adjustment unit.
FIG. 4 is an explanatory view of a color sensor.
FIG. 5 is a view for illustrating an ICC profile.

DESCRIPTION OF THE EMBODIMENTS (Image Forming Apparatus)

In this embodiment, a method for solving the above-mentioned problems is described using an electrophotographic laser beam printer. In this embodiment, an electrophotographic image forming apparatus is employed as an example. However, for example, an inkjet printer and a dye-sublimation printer have the same problems in image fixing using a thermal dry method. Thus, this embodiment is also applied to an inkjet image forming apparatus and a dye-sublimation image forming apparatus.

Figure 1:
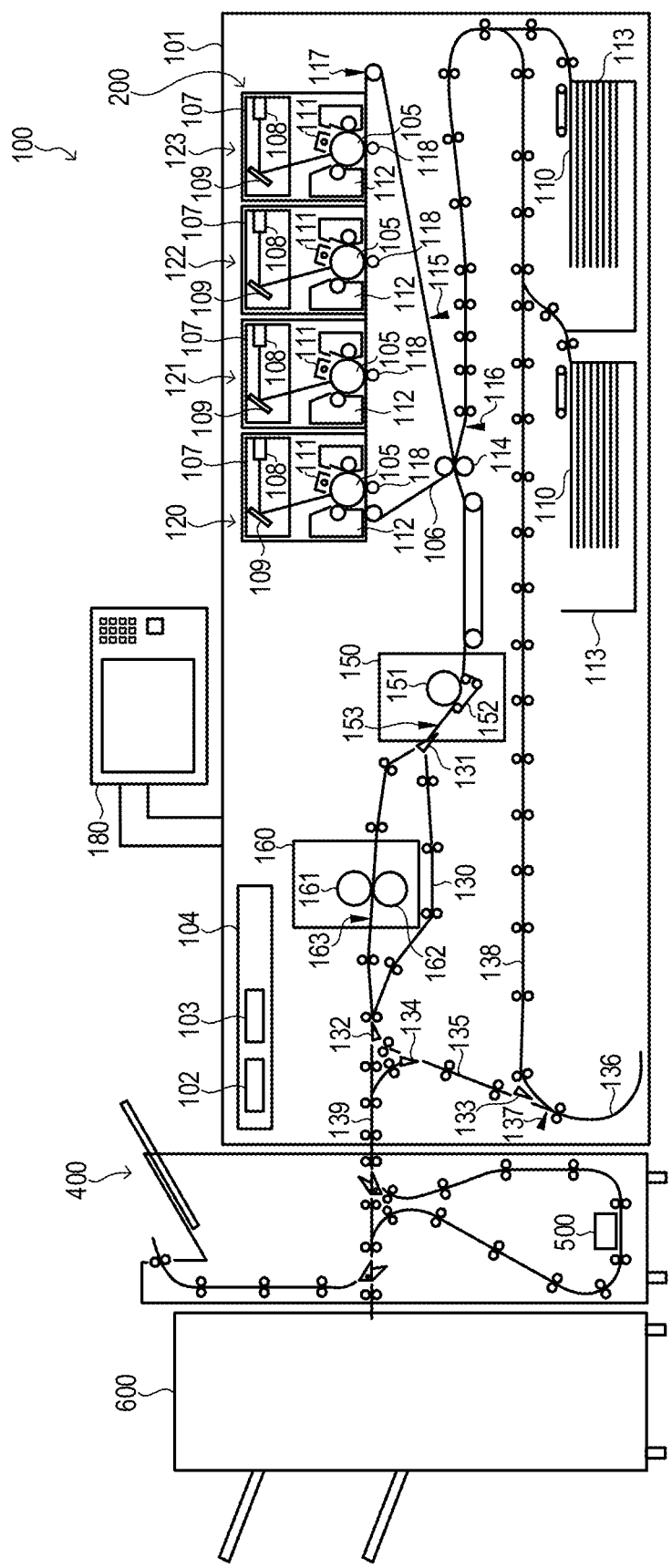
FIG. 1 is a sectional view of an image forming apparatus.

FIG. 1 is a sectional view of an image forming apparatus (hereinafter referred to as "printer") 100. The printer 100 includes a housing (main body) 101. The housing 101 is connected to an adjustment unit 400. The adjustment unit 400 is connected to a post-processing apparatus 600. Mechanisms for forming an engine portion 200 and a control board containing portion 104 are provided in the housing 101. An engine controller 102 and a printer controller 103 that are configured to perform control associated with print process processing (for example, feed processing) performed by the mechanisms are housed in the control board containing portion 104.

Four image forming stations 120, 121, 122, and 123 corresponding to YMCK are provided in the engine portion 200. The stations 120, 121, 122, and 123 are image forming units, each configured to transfer a toner image onto a sheet 110 to form an image. In this case, the abbreviation "YMCK" stands for yellow, magenta, cyan, and black. Each of the stations 120, 121, 122, and 123 includes substantially common components. The engine portion 200 includes an optical processing mechanism, a fixing processing mechanism, a feed processing mechanism, and a conveyance processing mechanism.

The optical processing mechanism includes laser scanner portions 107. Each of the laser scanner portions 107 includes a semiconductor laser (light source) 108, a laser driver (not shown), a rotary polygon mirror (not shown), and a reflecting mirror 109. The laser driver (not shown) turns on and off laser light emitted from the semiconductor laser 108 in accordance with image data output from the printer controller 103. The laser light emitted from the semiconductor laser 108 is deflected in main scanning directions by the rotary polygon mirror (not shown). The laser light deflected in the main scanning directions is reflected by the reflecting mirror 109 to be incident on a photosensitive drum 105 so as to perform light-exposure on a surface of the photosensitive drum 105 in the main scanning directions.

The photosensitive drum 105 serving as an image bearing member is rotatable. A primary charger 111 is configured to uniformly charge the surface of the photosensitive drum 105. The laser scanner portion 107 is configured to radiate the laser light to the uniformly charged surface of the photosensitive drum 105 to form an electrostatic latent image on the surface of the photosensitive drum 105. A developing device 112 is configured to develop the electrostatic latent image with toner serving as a developer to form the toner image. A voltage having a polarity opposite to that of the toner image is applied to a primary transfer roller 118, and the primary transfer roller 118 transfers the toner image onto an intermediate transfer member 106 (primary transfer). When a color image is to be formed, a yellow toner image, a magenta toner image, a cyan toner image, and a black toner image are formed by the stations 120, 121, 122, and 123, respectively, and then are sequentially transferred onto the intermediate transfer member 106. As a result, a full-color visible image is formed on the intermediate transfer member 106. The photosensitive drums 105 and the developing devices 112 are removable.

The sheet 110 is conveyed from any one of sheet storages 113 to transfer rollers 114 by the feed processing mechanism. A bias having a polarity opposite to that of the toner is applied to the transfer rollers 114. The transfer rollers 114 are configured to bring the sheet 110 into pressure contact with the intermediate transfer member 106 so that the toner image is transferred onto the sheet 110 conveyed in a sub-scanning direction by the feed processing mechanism (secondary transfer).

Further, an image formation start position sensor 115, a feed timing sensor 116, and a density sensor 117 are arranged around the intermediate transfer member 106. The image formation start position sensor 115 is configured to output a detection signal for determining a print start position at the time of image formation. The feed timing sensor 116 is configured to output a detection signal for determining a timing of feeding the sheet 110. The density sensor 117 is configured to output a detection signal for measuring a density of each of patches at a time of density control.

The fixing processing mechanism includes a first fixing device 150 and a second fixing device 160 that are configured to fix the toner image transferred onto the sheet 110 with thermal pressure. The first fixing device 150 includes a fixing roller 151, a pressurizing belt 152, and a first post-fixing sensor 153. The fixing roller 151 is configured to apply heat to the sheet 110. The pressurizing belt 152 is configured to bring the sheet 110 into pressure contact with the fixing roller 151. The first post-fixing sensor 153 is configured to detect completion of the fixing. The fixing roller 151 is a hollow roller, and includes a heater therein. The fixing roller 151 and the pressurizing belt 152 are configured to be rotated to convey the sheet 110. The second fixing device 160 is arranged on downstream of the first fixing device 150 in a conveyance direction of the sheet 110. The second fixing device 160 is arranged for the purpose of applying gloss to the toner image that is fixed onto the sheet 110 by the first fixing device 150 or ensuring fixability. Similarly to the first fixing device 150, the second fixing device 160 includes a fixing roller 161, a pressurizing roller 162, and a second post-fixing sensor 163.

In some cases, depending on a kind of sheet 110, there is no need to cause the sheet 110 to pass through the second fixing device 160. In such cases, for the purpose of reducing energy consumption, the sheet 110 is caused to pass through a conveyance path 130 without being caused to pass through the second fixing device 160. A conveyance path switching flapper 131 is configured to switch a destination of the sheet 110 between the conveyance path 130 and the second fixing device 160.

A conveyance path switching flapper 132 is configured to switch a destination of the sheet 110 between a conveyance path 135 and a discharge path 139. A reverse sensor 137 is provided to the conveyance path 135. A leading edge of the sheet 110 passes through the reverse sensor 137 so that the sheet 110 is conveyed to a reverse portion 136. After the reverse sensor 137 detects a trailing edge of the sheet 110, the conveyance direction of the sheet 110 is switched. A conveyance path switching flapper 133 is configured to switch a destination of the sheet 110 between a conveyance path 138 for duplex image formation and the conveyance path 135. A conveyance path switching flapper 134 is a guiding member configured to guide the sheet 110 to the discharge path 139. After a position of the sheet 110 is detected by the reverse sensor 137, a switchback operation is performed in the reverse portion 136 to reverse the leading edge and the trailing edge of the sheet 110. The sheet 110 is conveyed through the discharge path 139 to the adjustment unit 400. The adjustment unit 400 includes a measurement unit 500.

Figure 2:
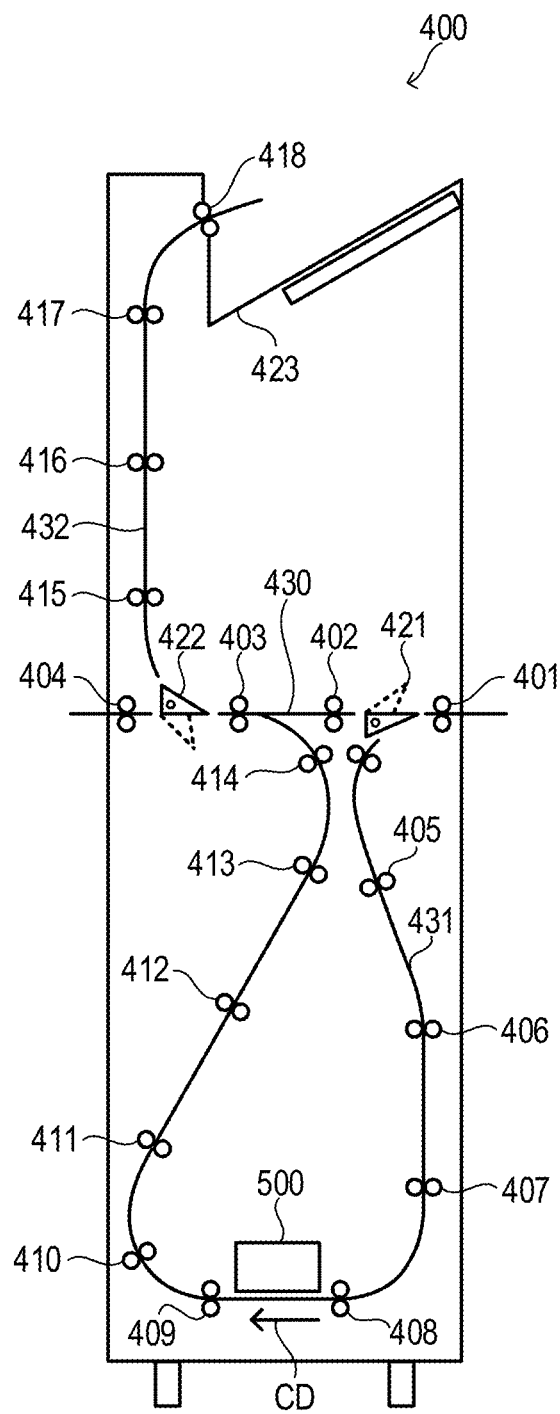
FIG. 2 is a sectional view of an adjustment unit.

FIG. 2 is a sectional view of the adjustment unit 400. When patch images formed on the sheet 110 are measured in accordance with an instruction from a console portion 180, the sheet 110, which has passed through the discharge path 139 and has been conveyed by conveyance rollers 401, is conveyed to a conveyance path 431 by a switching flapper 421. The sheet 110 is conveyed to the measurement unit 500 by conveyance rollers 405, 406, 407, and 408. The sheet 110 is conveyed from the measurement unit 500 to a switching flapper 422 by conveyance rollers 409, 410, 411, 412, 413, 414, and 403. The sheet 110 is conveyed to a conveyance path 432 by the switching flapper 422. The sheet 110 is discharged to a discharge tray 423 of the adjustment unit 400 by conveyance rollers 415, 416, 417, and 418.

When the patch images are not measured, the sheet 110, which has passed through the discharge path 139 and has been conveyed by the conveyance rollers 401, is conveyed to a conveyance path 430 by the switching flapper 421. The sheet 110 is conveyed to the switching flapper 422 by conveyance rollers 402 and the conveyance rollers 403. The switching flapper 422 guides the sheet 110 to discharge rollers 404. The discharge rollers 404 discharge the sheet 110 to the post-processing apparatus 600.

(Color Sensor)

Now, a structure and a measurement operation of a measurement portion (hereinafter referred to as "color sensor") 551 provided in the measurement unit 500 configured to measure an image formed on the sheet 110 are described. FIG. 4 is an explanatory view of the color sensor 551. The color sensor 551 includes a white LED 501, a lens 506, a diffraction grating 502, a line sensor 503, a calculator unit 504, and a memory 505. The white LED 501 is a light-emitting element configured to radiate light to a patch image to be measured (hereinafter referred to as "patch") P on the sheet 110. The lens 506 is configured to focus the light emitted from the white LED 501 on the patch P corresponding to the image to be measured on the sheet 110 and focus the light reflected from the patch P on the diffraction grating 502. The lens 506 may be omitted.

The diffraction grating 502 is configured to spectrally diffract the light reflected from the patch P. The line sensor 503 (light-emitting elements 503-1 to 503-*n*) includes n pixels (light-emitting elements) configured to receive the light spectrally diffracted by the diffraction grating 502. The n pixels are arranged so that the light spectrally diffracted by the diffraction grating 502 is received for each wavelength. Each of the pixels is configured to output an output value based on light intensity of the received light. The calculator unit 504 is configured to calculate spectral data based on the output values (light intensity values) of the pixels, which are output from the line sensor 503. The spectral data is, for example, a spectral reflectivity. The memory 505 is configured to store various types of data to be used by the calculator unit 504 for calculation processing. Further, the calculator unit 504 is configured to calculate coordinates (L*, a*, b*) of a CIE L*a*b* color space based on the output values (light intensity values) of the pixels as the spectral data. The calculator unit 504 includes a spectral calculator 504a and a Lab calculator 504b. The spectral calculator 504a is configured to calculate the spectral reflectivity. The Lab calculator 504b is configured to calculate the coordinates (L*, a*, b*) in the CIE L*a*b* color space.

The color sensor 551 is configured to perform conversion to the CIE L*a*b* color space in consideration of tristimulus values of colors. The abbreviation "CIE" stands for "Commission Internationale de l'Eclairage". The color sensor 551 of this embodiment is a spectral colorimeter configured to spectrally diffract the reflected light for each wavelength through the diffraction grating 502 to output the spectral data of the patch P. In general, a depth of focus of the spectral colorimeter is larger than a depth of focus of a CCD. Some spectral colorimeters have a large depth of focus. However, the spectral colorimeters having a large depth of focus are expensive. Spectral colorimeters having a small depth of focus are inexpensive.

As an index of color matching accuracy and stability of colors, an average of a color difference ΔE is defined to be 4.0 or smaller in a color matching accuracy standard (IT8.7/4 (ISO 12642: 1617 patches) [4.2.2]) described in ISO 12647-7. Further, for reproducibility [4.2.3] corresponding to a standard for stability, the color difference ΔE of each of the patches is defined to be 1.5 or smaller. In order to satisfy the specifications described above, it is desirable that the color difference ΔE be 1.0 or smaller as detection accuracy of the color sensor. The color difference ΔE can be expressed as a three-dimensional distance (Expression 1) between two points $(L^*_1, a^*_1, b^*_1)$ and $(L^*_2, a^*_2, b^*_2)$ in the L*a*b* color space defined by the CIE, which is described later.

$$\Delta E = \sqrt{(L_1^* - L_2^*)^2 + (a_1^* - a_2^*)^2 + (b_1^* - b_2^*)^2} \quad \text{(Expression 1)}$$

(Description of Adjustment Basic Operation)

Next, an adjustment operation for adjusting colors of an image printed by the printer 100 by creating a conversion condition based on a result detected by the color sensor 551 is described. The printer 100 converts the image data based on the conversion condition, and forms the image on the sheet 110 based on the converted image data. As the conversion condition, for example, an International Color Consortium (ICC) profile, which is a profile for achieving excellent color reproducibility, is used. However, the conversion condition of this embodiment is not limited to the ICC profile. Besides the ICC profile, a Color Rendering Dictionary (CRD) employed in PostScript (trademark) level 2 and the later version by Adobe Inc. or a color separation table in Photoshop (trademark) may be used. Further, a CMYK simulation in ColorWise (trademark) by EFI Inc., for maintaining black print information, may also be used. In this case, the abbreviation "CMYK" stands for cyan, magenta, yellow, and black. The image data input to the printer 100 is converted based on the ICC profile corresponding to the conversion condition, and is used for controlling the semiconductor lasers 108.

(Creation of Output ICC Profile Using Color Sensor 551)

The ICC profile is prestored in the printer 100. Further, the printer 100 is connected to the adjustment unit 400. The measurement unit 500 provided in the adjustment unit 400 includes the color sensor 551 configured to output the spectral data. The measurement unit 500 measures, for example, the spectral reflectivity, and creates an output ICC profile based on the spectral reflectivity. Then, the measurement unit 500 performs internal conversion color processing with use of the created output ICC profile. With the internal conversion color processing, the printer 100 converts the image data based on the output ICC profile in place of the prestored ICC profile.

The light radiated from the white LED 501 is incident on the patch (target to be measured) P. The reflected light is spectrally diffracted by the diffraction grating 502, and is received by the line sensor 503. The line sensor (CMOS sensor) 503 including the pixels arranged in wavelength ranges of from 380 nm to 720 nm outputs the spectral reflectivity. In this example, in order to improve detection calculation accuracy, the spectral reflectivity is converted into L*a*b* (chromaticity) through, for example, color-matching functions in accordance with the provisions of the CIE. The ICC profile, which is a color conversion profile, is created based on a relationship between YMCK color signal values of the patch P and L*a*b*.

(L*a*b* Calculation)

The following is a method of calculating the chromaticity (L*a*b*) from the spectral reflectivity (defined in ISO 13655).

a. Obtain a spectral reflectivity R(λ) of a sample (from 380 nm to 780 nm).

b. Prepare color-matching functions x(λ), y(λ), and z(λ) and a standard light spectral distribution SD50(λ). The color-matching functions are defined in JIS Z8701. The standard light spectral distribution SD50(2) is defined in JIS Z8720, and is also called "supplementary standard illuminant D50".

c. Calculate R(λ)×SD50(λ)×x(λ), R(λ)×SD50(λ)×y(λ), and R(λ)×SD50(λ)×z(λ).

d. Perform integration for the wavelengths.

$$\Sigma\{R(\lambda) \times SD50(\lambda) \times x(\lambda)\}$$

$$\Sigma\{R(\lambda) \times SD50(\lambda) \times y(\lambda)\}$$

$$\Sigma\{R(\lambda) \times SD50(\lambda) \times z(\lambda)\}$$

e. Integrate a product of the color-matching function y(λ) and the standard light spectral distribution SD50(2) for the wavelengths.

$$\Sigma\{SD50(\lambda) \times y(\lambda)\}$$

f. Calculate XYZ.

$$X = 100\{SD50(\lambda) \times y(\lambda)\} / \Sigma\{R(\lambda) \times SD50(\lambda) \times x(\lambda)\}$$

$$Y = 100\{SD50(\lambda) \times y(\lambda)\} / \Sigma\{R(\lambda) \times SD50(\lambda) \times y(\lambda)\}$$

$$Z = 100\{SD50(\lambda) \times y(\lambda)\} / \Sigma\{R(\lambda) \times SD50(\lambda) \times z(\lambda)\}$$

g. Calculate L*a*b*

$$L^* = 116 \times (Y/Yn)^{(1/3)} - 16$$

$$a^* = 500\{(X/Xn)^{(1/3)} - (Y/Yn)^{(1/3)}\}$$

$$b^* = 200\{(Y/Yn)^{(1/3)} - (Z/Zn)^{(1/3)}\}$$

In expressions, Xn, Yn and Zn are standard light tristimulus values. When Y/Yn>0.008856, $$(X/Xn)^{(1/3)} = 7.78(X/Xn)^{(1/3)} + 16/116$$

$$(Y/Yn)^{(1/3)} = 7.78(Y/Yn)^{(1/3)} + 16/116$$

$$(Z/Zn)^{(1/3)} = 7.78(Z/Zn)^{(1/3)} + 16/116$$

It is noted that x(λ), y(λ), and z(λ) are generally represented as $$\overline{x}(\lambda), \overline{y}(\lambda), \overline{z}(\lambda)$$

(Profile Creation Processing)

FIG. 3 is a block diagram for illustrating a control system of the printer 100 and the adjustment unit 400. Profile creation processing is performed when a component is replaced by a customer engineer, before a job requiring color matching accuracy is performed, or when a user operates the console portion 180 to find out a hue of a final output object in a design planning stage.

The printer controller 103 executes the profile creation processing. First, a profile creation instruction is input to a profile creation portion 301 through the console portion 180. The profile creation portion 301 transmits a signal to the engine controller 102 so that a CMYK color chart, which is an ISO 12642 test form, is output without through a profile. At the same time, the profile creation portion 301 transmits a measurement instruction to a controller 451 of the adjustment unit 400 via a communication portion 450.

The engine controller 102 controls the printer 100 to execute processes such as charging, light exposure, development, transfer, and fixing. As a result, the ISO 12642 test form is formed on the sheet 110. The controller 451 controls the color sensor 551 to measure colors of the ISO 12642 test form. The controller 451 outputs spectral reflectivity data, which corresponds to measurement results of measured 928 patches, to a Lab calculator 303 of the printer controller 103. The Lab calculator 303 converts the spectral reflectivity data into L*a*b* data. The Lab calculator 303 outputs the L*a*b* data to the profile creation portion 301 via a color sensor input ICC profile storage 304. The Lab calculator 303 may convert the spectral reflectivity data into a CIE 1931 XYZ colorimetric system, which is a device-independent color space signal, in place of the L*a*b* data.

The profile creation portion 301 creates the output ICC profile based on a relationship between the CMYK signals output to the engine controller 102 and the L*a*b* data input from the Lab calculator 303. The profile creation portion 301 replaces the output ICC profile stored in an output ICC profile storage 305 with the created output ICC profile. The ISO 12642 test form contains CMYK color signal patches that cover a gamut that can be output from a general copying machine. A color conversion table is created based on a relationship between color signal values and measured L*a*b* values. Specifically, a conversion table (A2Bx tag) from CMYK into Lab is created. Based on the conversion table, an inverse conversion table (B2Ax tag) is created.

FIG. 5 is a view for illustrating the ICC profile. The ICC profile contains a header, tags, and data thereof. The tags include a tag of the color conversion table and a (gamt) tag for describing whether a white point (Wtpt) or a certain color represented by Lab values defined in the profile is inside or outside a reproducible range.

When receiving a profile creation command from a host computer via an I/F 308, the profile creation portion 301 outputs the created output ICC profile to the host computer via the I/F 308. The host computer can execute color conversion corresponding to the ICC profile on an application program.

(Color Conversion Processing)

In color conversion in general color output, RGB signal values or standard printing CMYK signal values such as those of Japan Color (trademark) are input from an external apparatus such as a scanner portion (image reading apparatus) via the I/F 308 to the printer controller 103. Input image signals such as the RGB signal values or the standard printing CMYK signal values are transmitted to an input ICC profile storage 307 for external input. The input ICC profile storage 307 executes conversion from RGB into L*a*b* or conversion from CMYK into L*a*b* in accordance with the image signals input via the I/F 308. The input ICC profile stored in the input ICC profile storage 307 includes a plurality of lookup tables (LUTs). The LUTs include a one-dimensional LUT configured to control a gamma of an input signal, a multi-color LUT called "direct mapping", and a one-dimensional LUT configured to control a gamma of generated conversion data. The input image signals (RGB signal values or standard printing CMYK signal values) are converted from a device-dependent color space into device-independent L*a*b* data by using the above-mentioned LUTs.

The image signals converted into values in L*a*b* coordinates are input to a Color Management Module (CMM) 306. The CMM 306 executes various types of color conversion. For example, the CMM 306 executes GAMUT conversion. In the GAMUT conversion, mismatch between a read color space of the scanner portions serving as input devices and an output color reproduction range of the printer 100 serving as an output device is mapped. Further, the CMM 306 executes color conversion for adjusting mismatch (also called "color temperature setting mismatch") between a light source type used at a time of input and a light source type used at a time of observation of an output object. Further, the CMM 306 executes black character determination. The CMM 306 converts the L*a*b* data into L*'a*'b*' data, and inputs the L*'a*'b*' data to the output ICC profile storage 305. The output ICC profile created by measuring the patches P is stored in the output ICC profile storage 305. Thus, the output ICC profile storage 305 performs the color conversion on the L*'a*'b*' data with use of the new created output ICC profile to convert the L*'a*'b*' data into output device-dependent CMYK signals, and outputs the CMYK signals to the engine controller 102.

Figure 6:
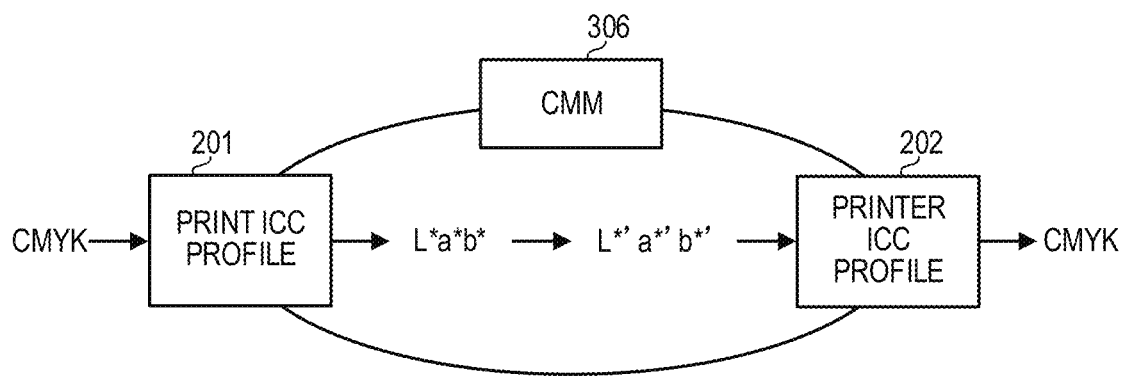
FIG. 6 is a diagram for illustrating a color management environment.

In FIG. 3, the CMM 306 is provided separately from the input ICC profile storage 307 and the output ICC profile storage 305. However, the CMM 306 is a module that performs color management. As illustrated in FIG. 6, the CMM 306 is a module that performs color conversion by using an input profile (print ICC profile 201) and an output profile (printer ICC profile 202).

(Description of Measurement Operation)

Figure 7:
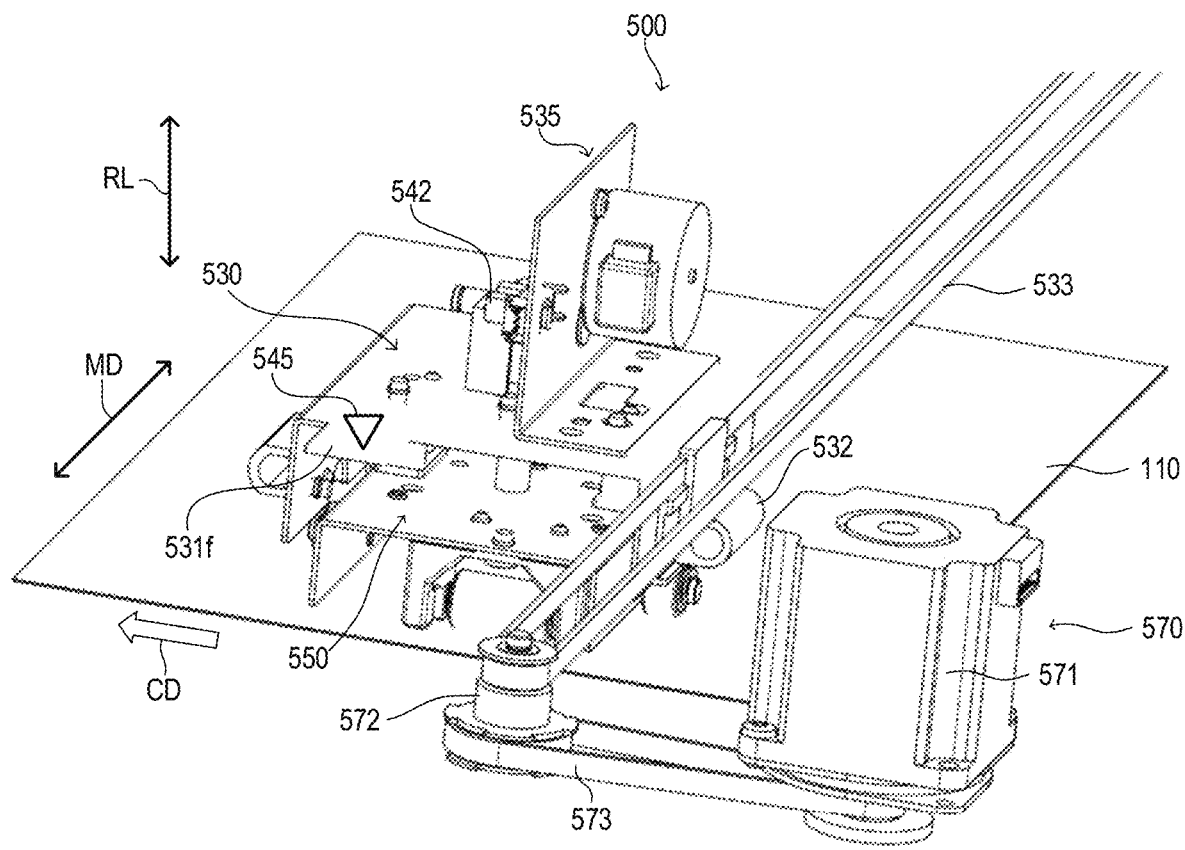
FIG. 7 is a view for illustrating a measurement unit.

With reference to FIG. 7 to FIG. 12C, a measurement operation for the patches P, which is performed by the measurement unit 500 including the color sensor 551, is described. The color sensor 551 measures the patches P (described later with reference to FIG. 13A, FIG. 13B, FIG. 13C, and FIG. 13D) formed on the sheet 110. FIG. 7 is a view for illustrating the measurement unit 500. As illustrated in FIG. 7, the measurement unit 500 includes a movement unit 530, a raising and lowering unit (raising and lowering portion) 550, a first drive unit 570, and a second drive unit 535. The movement unit 530 is configured to hold the raising and lowering unit 550 so that the raising and lowering unit 550 is movable in raising and lowering directions RL. The first drive unit 570 is configured to move the movement unit 530 in front-and-rear directions (hereinafter referred to as "movement directions") MD of the printer 100 so that the raising and lowering unit 550 slides together with the movement unit 530. In this case, the front-and-rear directions (movement directions) of the printer 100 are directions orthogonal to the conveyance direction of the sheet on which the patches P are formed. The second drive unit 535 is configured to move the raising and lowering unit 550 in the raising and lowering directions RL with respect to the movement unit 530. The measurement unit 500 is configured to raise and lower the raising and lowering unit 550 on which the color sensor 551 is mounted so as to focus the color sensor 551 having a small depth of focus on the patches P.

The first drive unit 570 includes a slide position sensor 545 configured to detect a position of the movement unit 530 in the movement directions (sliding directions) MD. The first drive unit 570 is provided in the adjustment unit 400. The second drive unit 535 includes a raising and lowering position sensor 542 configured to detect a position of the raising and lowering unit 550 in the raising and lowering directions RL. The second drive unit 535 is provided to the movement unit 530.

The raising and lowering unit (holding member) 550 is configured to hold the color sensor 551. The second drive unit 535 is configured to raise and lower the raising and lowering unit 550 to raise and lower the color sensor 551 with respect to the sheet 110. As illustrated in FIG. 2, the conveyance rollers 408 are provided on an upstream side of the measurement unit 500 in a conveyance direction CD of the sheet 110, and the conveyance rollers 409 are provided on a downstream side of the measurement unit 500. The conveyance rollers 408 and 409 form a conveyance unit configured to convey the sheet 110 in the conveyance direction CD with respect to the measurement unit 500. As illustrated in FIG. 7, after the measurement unit 500 receives the sheet 110 conveyed in the conveyance direction CD, measurement is performed by the color sensor 551 while the movement unit 530 and the raising and lowering unit 550 are both moving in the movement directions MD along a surface of the sheet 110. It is preferred that the movement directions (first movement directions) MD be orthogonal to the conveyance direction CD. It is preferred that the raising and lowering directions (second movement directions) RL be orthogonal to the movement directions MD and the conveyance direction CD.

Figure 8:
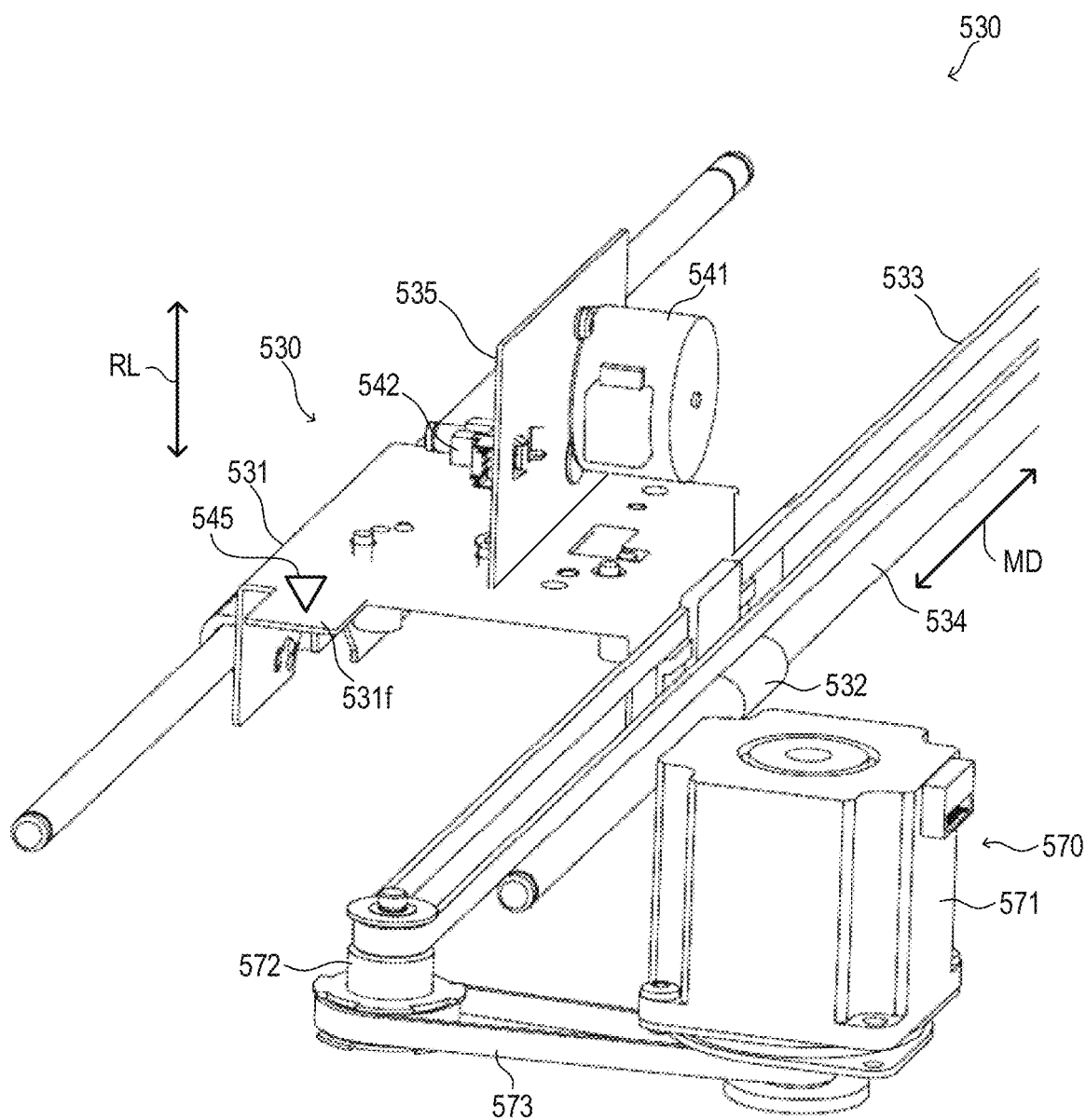
FIG. 8 is a view for illustrating a movement unit.

With reference to FIG. 8, the movement unit 530 is described. FIG. 8 is a view for illustrating the movement unit 530. A movement bearing 532 is mounted to a movement support plate 531. The movement bearing 532 has a tooth flank portion to be engaged with a movement belt 533 and a hollow cylindrical portion to be engaged with a movement shaft 534. The movement belt 533 is engaged with a first motor (first movement unit) 571 through a movement pulley 572 and a drive belt 573. Specifically, through rotation of the first motor 571, the movement unit 530 is moved in the movement directions MD. A position of the movement unit 530 in the movement directions MD is controlled by counting the number of pulses transmitted after a flag portion 531f of the movement support plate 531 switches on and off the slide position sensor 545. The second drive unit 535 including a second motor (second movement unit) 541 and the raising and lowering position sensor 542 is mounted onto the movement support plate 531. The second motor 541 is a raising and lowering portion configured to raise and lower the raising and lowering unit 550 in the raising and lowering directions RL so that the color sensor 551 is brought closer to and away from the surface of the sheet 110. The raising and lowering position sensor 542 is configured to detect a position (raising and lowering height) of the raising and lowering unit 550 in the raising and lowering directions RL.

Figure 9A:
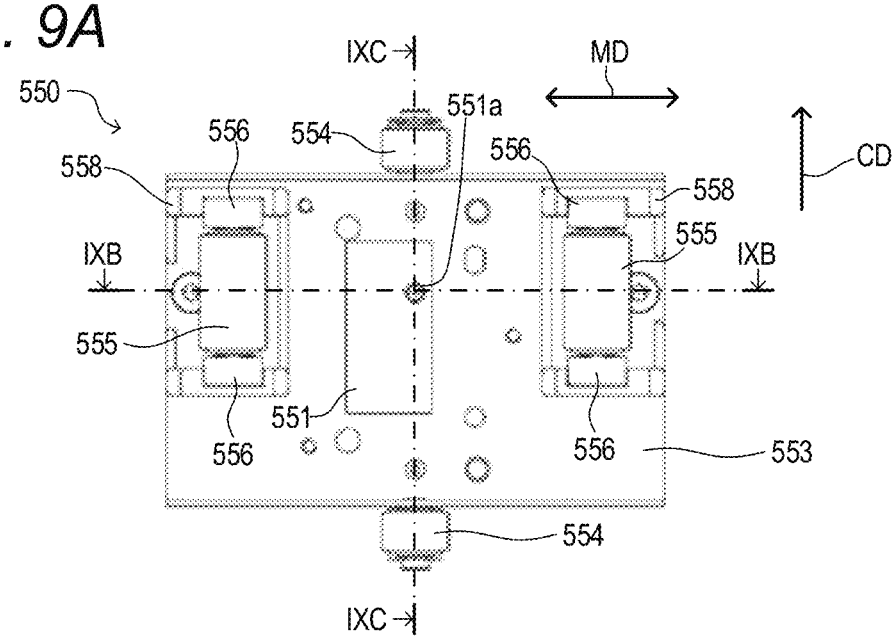
FIG. 9A, FIG. 9B, and FIG. 9C are views for illustrating a raising and lowering unit onto which the color sensor is mounted.
Figure 9B:
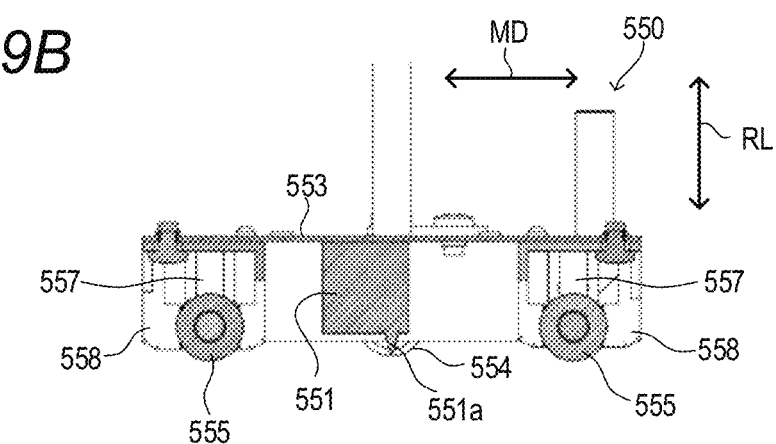
Figure 9C:
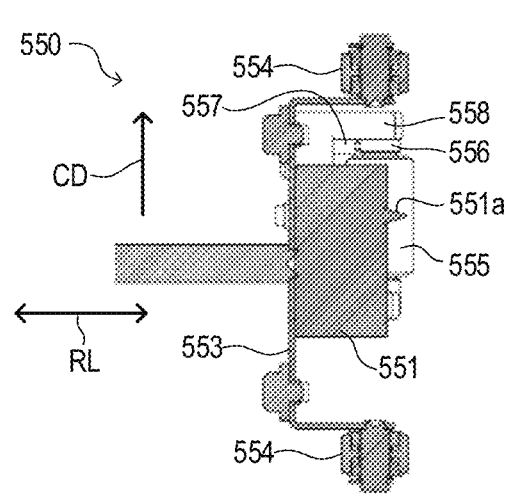

FIG. 9A, FIG. 9B, and FIG. 9C are views for illustrating the raising and lowering unit 550 to which the color sensor 551 is mounted. FIG. 9A is a bottom view of the raising and lowering unit 550. FIG. 9B is a sectional view taken along the line IXB-IXB of FIG. 9A. FIG. 9C is a sectional view taken along the line IXC-IXC of FIG. 9A. The color sensor 551 is mounted to a raising and lowering support plate 553, and is built in the raising and lowering unit 550. A light portion 551a represents light emitted from the while LED 501 (FIG. 4) and reflected light thereof. The light portion 551a corresponds to a detection area of the color sensor 551.

Fixed rollers (a first abutment member and a second abutment member) 554 are mounted to both end portions of the raising and lowering support plate 553 in the conveyance direction CD of the sheet 110. The fixed rollers 554 are arranged in the vicinity of the color sensor 551 so as to be able to hold and press the sheet 110 toward the conveyance path 431 side in the vicinity of the color sensor 551. The sheet 110 is held between the conveyance path 431 and the fixed rollers 554. The conveyance path 431 functions as a support member configured to support the sheet 110. When the measurement unit 500 is brought into contact with the sheet 110 and is moved in the movement directions MD, the fixed rollers 554 are driven to be rotated. The fixed rollers 554 are provided on an upstream side and a downstream side of the color sensor 551 in the conveyance direction CD, respectively. The fixed rollers 554 are provided at positions different from a position of the light portion 551a of the color sensor 551 in the conveyance direction CD. Further, the positions of the fixed rollers 554 in the movement directions MD overlap with the position of the light portion 551a of the color sensor 551 in the movement directions MD when viewed in the conveyance direction CD.

Raising and lowering rollers (a third abutment member and a fourth abutment member) 555 are mounted onto both end portions of the raising and lowering support plate 553 in the movement directions MD, respectively. The raising and lowering rollers 555 are arranged in the vicinity of the color sensor 551 so as to be able to hold and press the sheet 110 toward the conveyance path 431 side in the vicinity of the color sensor 551. Each of the raising and lowering rollers 555 is mounted onto the raising and lowering support plate 553 through bearings 556, a spring (elastic member) 557, and a holder (holding member) 558. Each of the raising and lowering rollers 555 is held by the holder 558 so as to be movable in the raising and lowering directions RL with respect to the holder 558 when being biased by the spring 557. The sheet 110 is held between the conveyance path 431 and the raising and lowering rollers 555. The conveyance path 431 functions as the support member configured to support the sheet 110. The raising and lowering rollers 555 are rotatable while being held in contact with the sheet 110 and being moved in the movement directions MD. The raising and lowering rollers 555 are provided on an upstream side and a downstream side of the color sensor 551 in the movement directions MD, respectively. The raising and lowering rollers 555 are provided at positions different from the position of the light portion 551a of the color sensor 551 in the movement directions MD. Further, the positions of the raising and lowering rollers 555 in the conveyance direction CD overlap with the position of the light portion 551a of the color sensor 551 in the conveyance direction CD when viewed in the movement directions MD. The raising and lowering unit 550 can be raised and lowered in the raising and lowering directions RL by the second drive unit 535, and can be moved in the movement directions MD together with the movement unit 530.

As described above, the raising and lowering unit 550 can be raised and lowered by the second drive unit 535, and both of the movement unit 530 and the raising and lowering unit 550 are reciprocated by the rotation of the first motor 571 of the first drive unit 570 in the movement directions MD. Specifically, the raising and lowering unit 550 can be raised and lowered at any position in the movement directions MD while being moved in the movement directions MD. As illustrated in FIG. 9B, the raising and lowering rollers 555 project in the raising and lowering directions RL with respect to the fixed rollers 554.

Figure 10A:
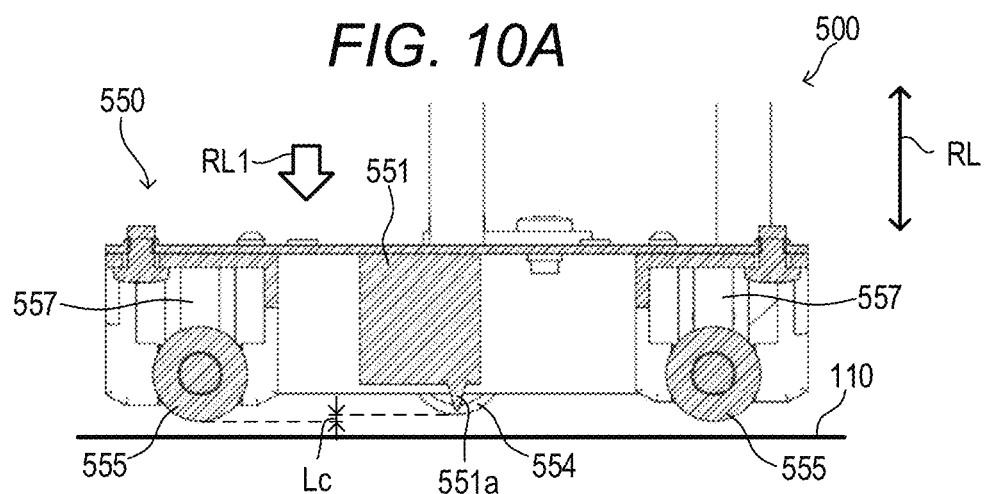
FIG. 10A, FIG. 10B, and FIG. 10C are views for illustrating an operation of the raising and lowering unit of the measurement unit.
Figure 10B:
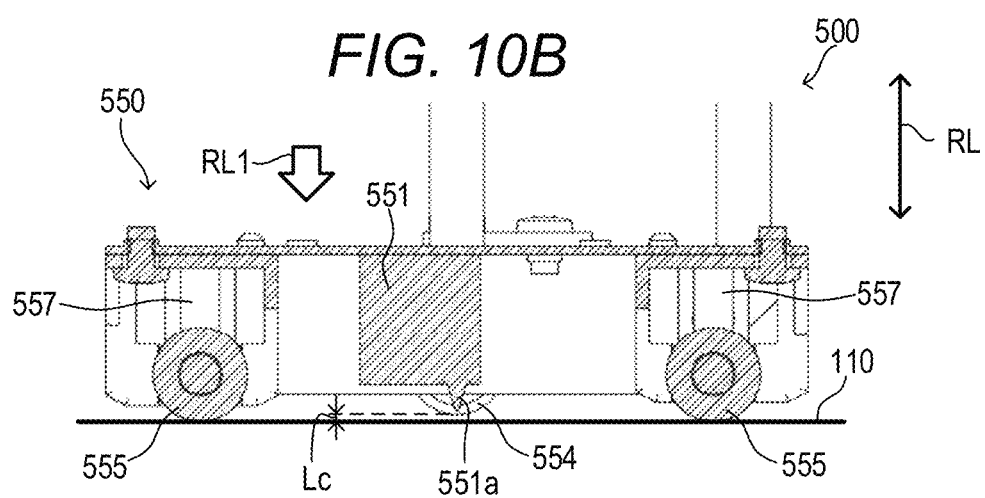
Figure 10C:
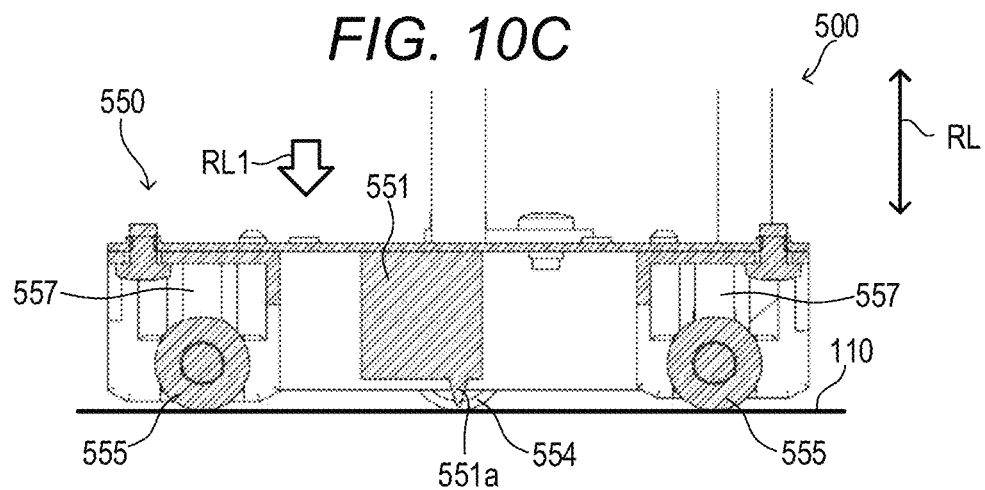

Next, with reference to FIG. 10A, FIG. 10B, and FIG. 10C, an operation of the measurement unit 500 is described. In the operation of the measurement unit 500, the measurement is performed by the color sensor 551 while the sheet is being held by the fixing rollers 554 and the raising and lowering rollers 555. FIG. 10A, FIG. 10B, and FIG. 10C are views for illustrating an operation of the raising and lowering unit 550 of the measurement unit 500. As illustrated in FIG. 10A, the raising and lowering rollers 555 project beyond the fixed rollers 554 toward the sheet 110 by a distance Lc. As illustrated in FIG. 10A, the raising and lowering unit 550 including the color sensor 551 is lowered toward the sheet 110 in a lowering direction RL1.

As illustrated in FIG. 10B, the raising and lowering rollers 555 are brought into abutment against the sheet 110 earlier than the fixed rollers 554. At this time, the raising and lowering rollers 555 are in abutment against the sheet 110, and a gap having the distance Lc is defined between the fixed rollers 554 and the sheet 110. The raising and lowering rollers 555 are held in the raising and lowering unit 550 so as to be movable in the raising and lowering directions RL. As illustrated in FIG. 10C, when the raising and lowering unit 550 is further lowered in the lowering direction RL1, the raising and lowering rollers 555 push up the springs 557. Then, the fixed rollers 554 are brought into abutment against the sheet 110 while the raising and lowering rollers 555 are held in abutment against the sheet 110. As described above, the raising and lowering rollers 555 fulfill a role of suspensions so that the raising and lowering rollers 555 are first brought into abutment against the sheet 110 and then the fixed rollers 554 are brought into abutment against the sheet 110. The fixed rollers 554 are held in the raising and lowering unit 550 so as not to be moved in the raising and lowering directions RL.

Figure 11A:
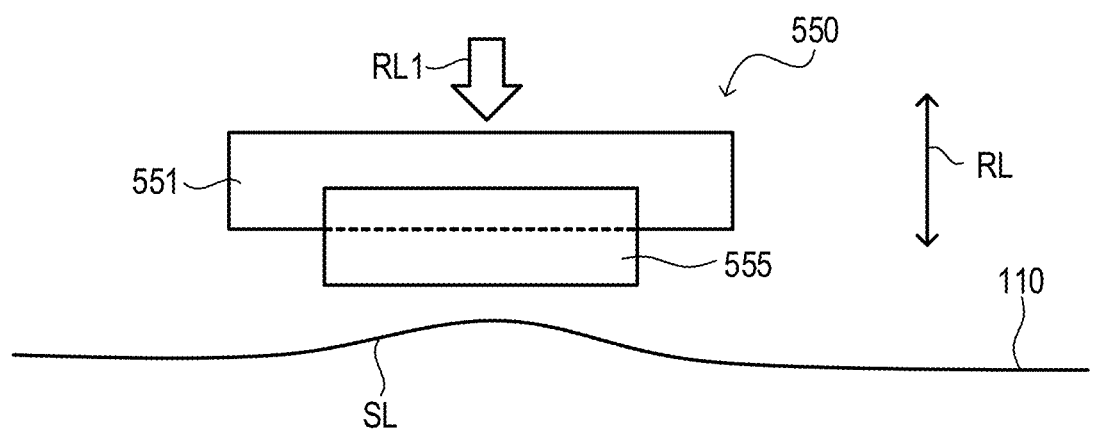
FIG. 11A, FIG. 11B, and FIG. 11C are explanatory views for illustrating a sheet holding operation of a raising and lowering roller.
Figure 11B:
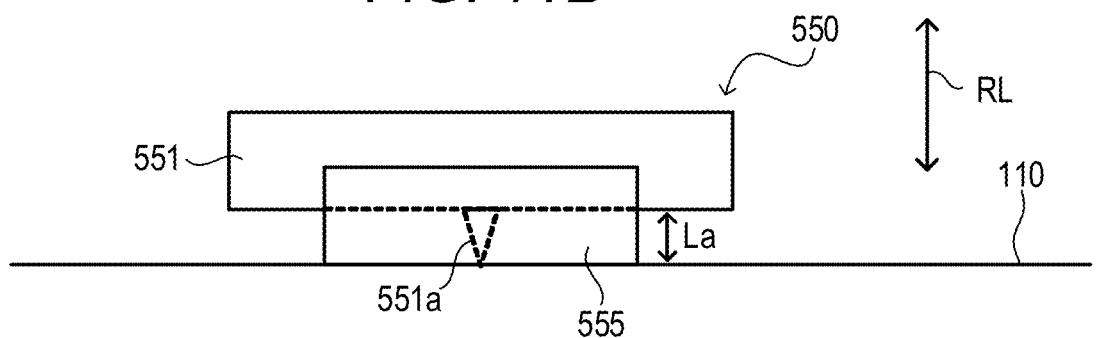
Figure 11C:
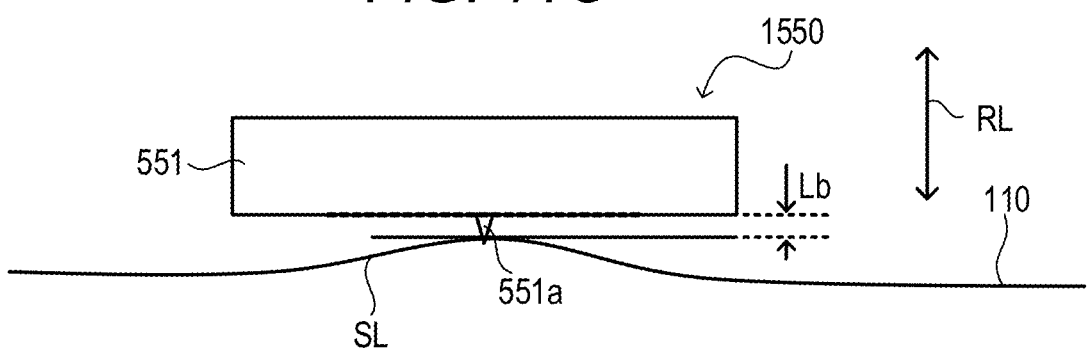

With reference to FIG. 11A, FIG. 11B, and FIG. 11C, an effect produced by the abutment of the raising and lowering rollers 555 against the sheet 110 earlier than the abutment of the fixed rollers 554 is described. FIG. 11A, FIG. 11B, and FIG. 11C are explanatory views for illustrating a sheet holding operation of the raising and lowering roller 555. FIG. 11A is a view for illustrating a loop SL formed in the sheet 110 due to some cause. When the raising and lowering unit 550 is lowered toward the sheet 110, the loop SL can be eliminated by the raising and lowering roller 555 as illustrated in FIG. 11B. As a result, a distance La between the sheet 110 and the color sensor 551 can be set to fall within a range of a predetermined distance, which is suitable for the light portion 551a of the color sensor 551.

FIG. 11C is a view for illustrating a raising and lowering unit 1550 without the raising and lowering rollers 555 as a reference example. When the raising and lowering unit 1550 without the raising and lowering rollers 555 is lowered toward the sheet 110 having the loop SL, a distance Lb between the sheet 110 and the color sensor 551 becomes smaller than the distance La, as illustrated in FIG. 11C. When the distance Lb becomes smaller than the predetermined range suitable for the light portion 551a of the color sensor 551, reading accuracy of the color sensor 551, specifically, color matching accuracy is reduced.

Figure 12A:
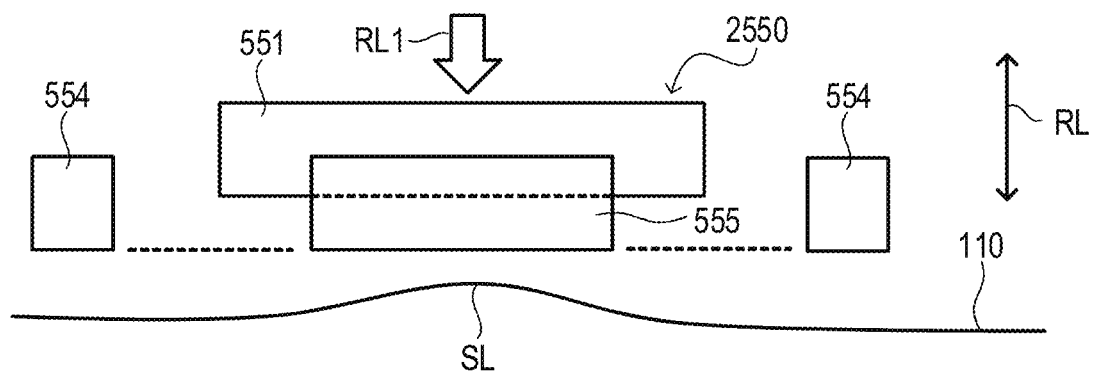
FIG. 12A, FIG. 12B, and FIG. 12C are explanatory views of a sheet holding operation of the raising and lowering roller in a reference example.
Figure 12B:
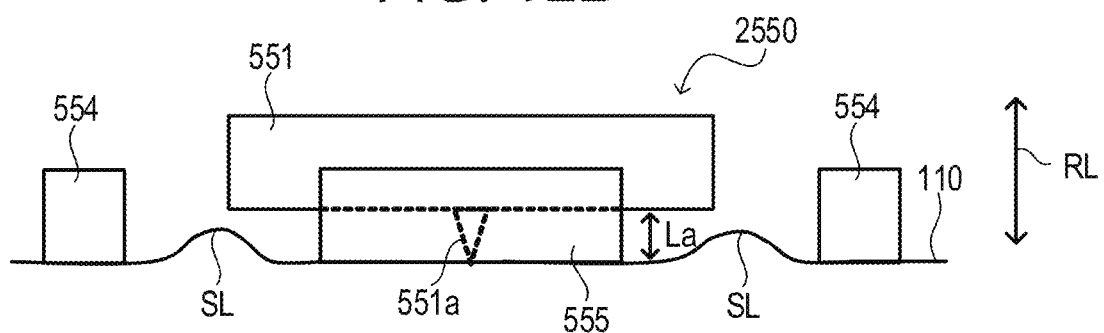
Figure 12C:
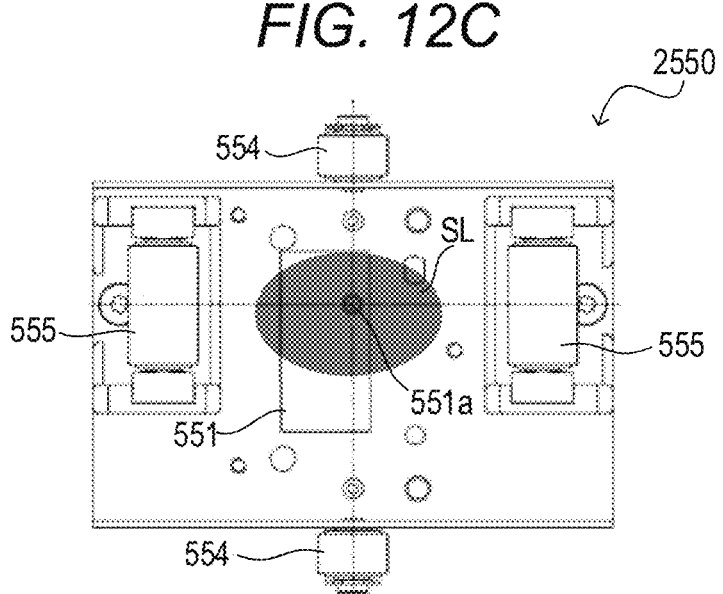

With reference to FIG. 12A, FIG. 12B, and FIG. 12C, there is described a case in which the fixed rollers 554 and the raising and lowering rollers 555 are brought into abutment with the sheet 110 at the same time or the fixed rollers 554 are brought into abutment against the sheet 110 earlier than the raising and lowering rollers 555. FIG. 12A, FIG. 12B, and FIG. 12C are explanatory views of the sheet holding operation of the raising and lowering rollers 555 in a reference example in which the raising and lowering rollers 555 project toward the sheet 110 by the same distance as a distance by which the fixed rollers 554 project. As illustrated in FIG. 12A, when a raising and lowering unit 2550 is lowered toward the sheet 110 having the loop SL in the lowering direction RL1, the loop SL is shifted to, for example, positions between the raising and lowering rollers 555 and the fixed rollers 554, as illustrated in FIG. 12B. When the loop SL is shifted to the positions between the raising and lowering rollers 555 and the fixed rollers 554, which have a short distance therebetween, as described above, each of the loops SL exceeds an elastic deformation area of the sheet 110 to form a wrinkle or a fold in the sheet 110.

The wrinkle or the fold formed in the sheet 110 not only reduces the color matching accuracy of the color sensor 551 but also causes a failure in conveyance of the sheet 110. Further, when the loops SL are formed with short spans as illustrated in FIG. 12B, deflection of each of the loops SL moves to another portion. Thus, as illustrated in FIG. 12C, the loop SL remains in an inner portion surrounded by the fixed rollers 554 and the raising and lowering rollers 555, specifically, at the light portion 551a of the color sensor 551. In this case, similarly to a state illustrated in FIG. 11C, a distance between the sheet 110 and the color sensor 551 becomes smaller than a range of a predetermined distance (height) suitable for the light portion 551a of the color sensor 551 to reduce the color matching accuracy.

Meanwhile, according to this embodiment, both of the movement unit 530 and the raising and lowering unit 550 are moved in the movement directions MD by the first drive unit 570. A position of the movement unit 530 in the movement directions MD is detected by the slide position sensor 545. The raising and lowering unit 550 is raised and lowered by the second motor 541 while being located at any position in the movement directions MD. The position of the raising and lowering unit 550 in the raising and lowering directions RL is detected by the raising and lowering position sensor 542. When the raising and lowering unit 550 is lowered, the raising and lowering rollers 555 hold the loop SL of the sheet 110 earlier than the fixed rollers 554. As a result, the distance La between the color sensor 551 and a measurement target surface of the sheet 110 can be set to fall within the range of the predetermined distance. In this manner, the detection accuracy of the color sensor 551 can be improved.

(Description of Measurement Job Operation)

Figure 13A:
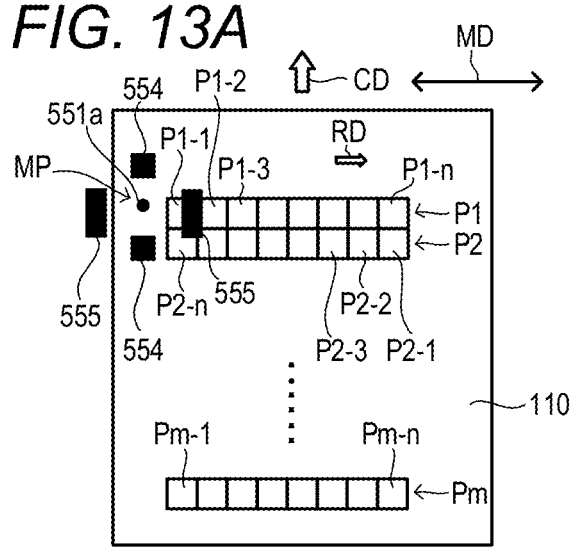
FIG. 13A, FIG. 13B, FIG. 13C, and FIG. 13D are views for illustrating a positional relationship between the raising and lowering rollers and patches on a sheet in an embodiment.
Figure 13B:
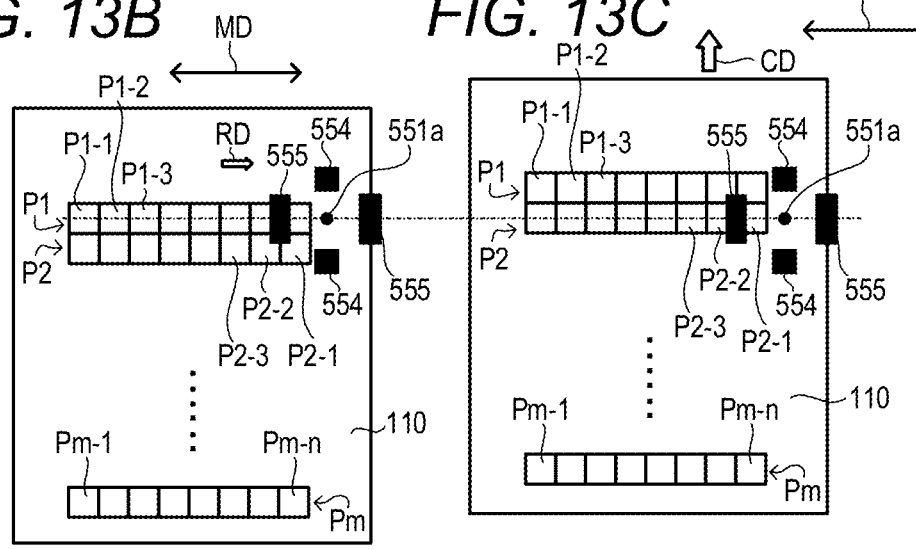
Figure 13C:
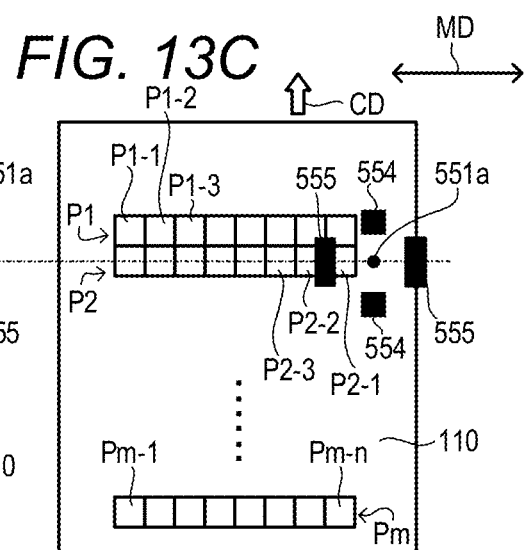
Figure 13D:
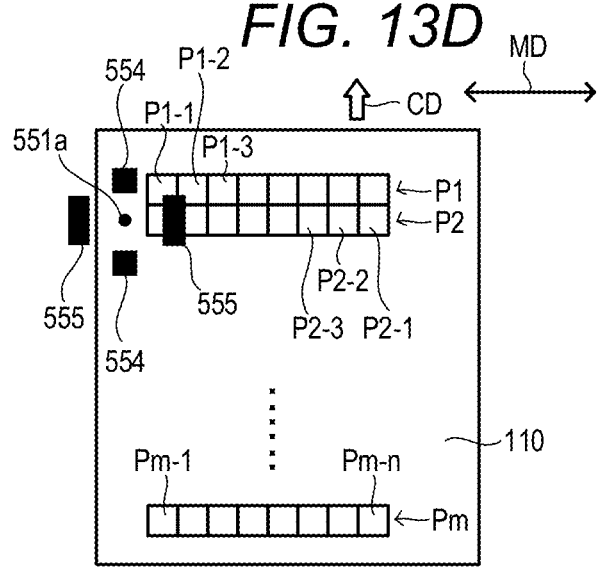
Figure 14:
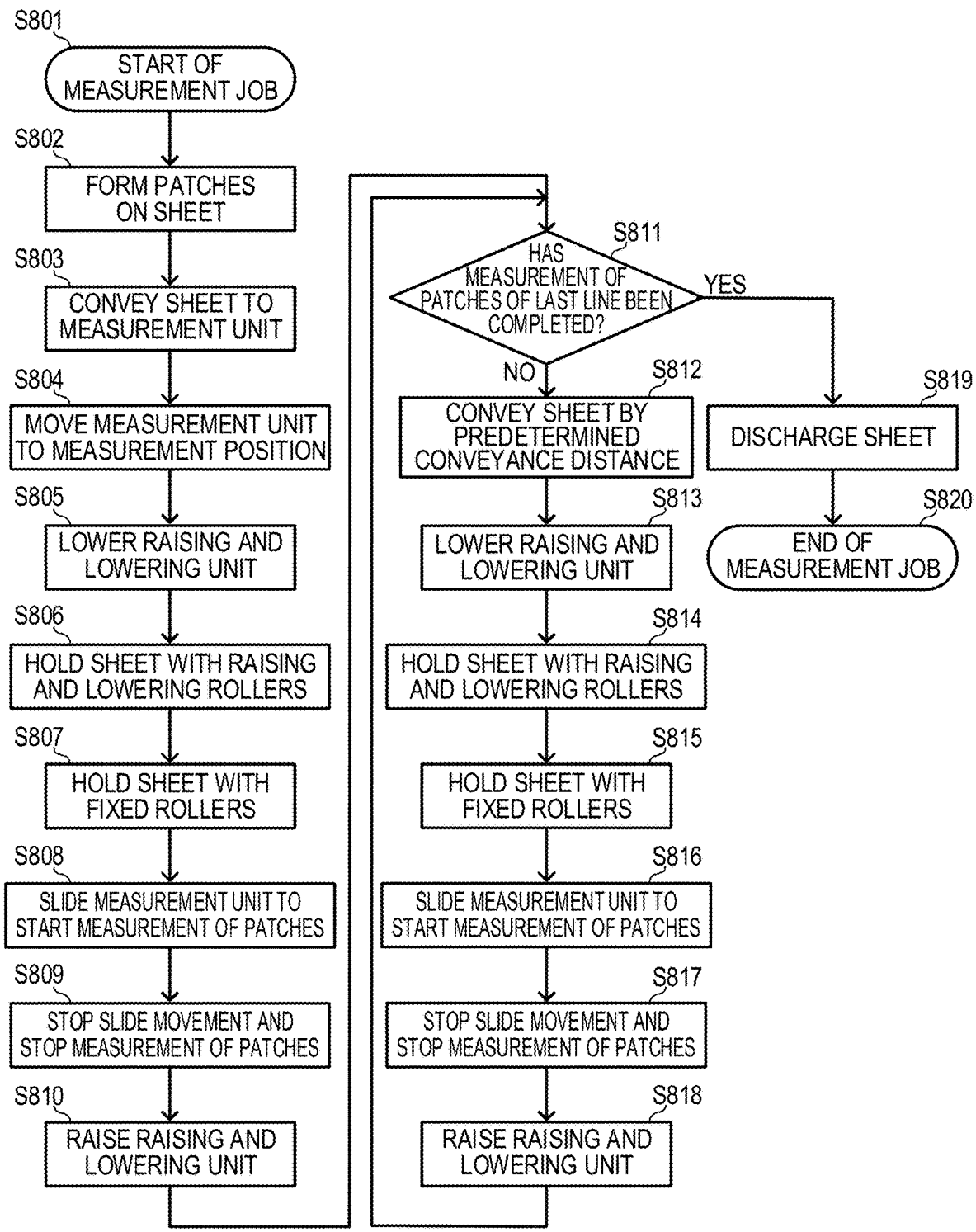
FIG. 14 is a flowchart for illustrating an operation of a measurement job.

Next, with reference to FIG. 13A, FIG. 13B, FIG. 13C, FIG. 13D, and FIG. 14, a measurement job operation for the patches P formed on the sheet 110 is described. FIG. 14 is a flowchart for illustrating the measurement job operation. The controller 451 of the adjustment unit 400 executes the measurement job operation in accordance with a program stored in a ROM 454 (FIG. 3). The controller 451 stores data generated during the measurement job operation in a RAM 455 (FIG. 3).

When a measurement job is input by a user, the controller 451 starts the measurement job (Step S801). Measurement patch images (hereinafter referred to as "patches") P (P1-1 to Pm-n) are formed on the sheet 110 by the printer 100 (Step S802). The sheet 110 is conveyed to the measurement unit 500 of the adjustment unit 400 (Step S803). When the sheet 110 reaches the measurement unit 500, the measurement unit 500 is moved to a measurement position MP in the vicinity of the patch P1-1 by the first motor 571 as described above (Step S804).

FIG. 13A, FIG. 13B, FIG. 13C, and FIG. 13D are views for illustrating a positional relationship between the raising and lowering rollers 555 and the patches P on the sheet 110 in this embodiment. FIG. 13A is a view when the sheet 110 is viewed from above. FIG. 13A is an illustration of the positional relationship among the patches P on the sheet 110, the light portion 551a of the color sensor 551, the fixed rollers 554, and the raising and lowering rollers 555 when the measurement unit 500 is located at the measurement position MP. A plurality of patches P are arranged in the movement directions (main scanning directions) MD and the conveyance direction (sub-scanning direction) CD on the sheet 110. In the conveyance direction CD of the sheet 110, the patches P include patches P1 of a first line closest the leading edge of the sheet 110, patches P2 of a second line, ..., and patches Pm of a last line closest to the trailing edge. The patches P1 of the first line include a patch P1-1 at a left end, an adjacent patch P1-2, an adjacent patch P1-3, ..., and a patch P1-n at a terminal end of the line of the patches P1. Subsequently, the patches P2 of the second line include a patch P2-1 at a right end, an adjacent patch P2-2, an adjacent patch P2-3, ..., and a patch P2-n at a terminal end of the line of the patches P2. The patches P include the patches Pm of the last line, which are arranged in the same manner. Specifically, n×m patches P are arranged on one sheet 110.

The raising and lowering unit 550 including the color sensor 551 is moved together with the movement unit 530 to the measurement position MP located on an outer side of the patch P1-1 at the left end of the first line so as to be at a predetermined distance therefrom, as illustrated in FIG. 13A. After that, the controller 451 controls the second motor 541 to lower the raising and lowering unit 550 (Step S805). When the raising and lowering unit 550 is lowered, the raising and lowering rollers 555 are first brought into abutment against the sheet 110 earlier than the fixed rollers 554 to hold the sheet 110 as described above (Step S806). In this manner, the loop SL of the sheet 110 is eliminated, and the sheet 110 is kept flat. Next, the fixed rollers 554 are brought into abutment against the sheet 110 to hold the sheet 110 (Step S807). As a result, the distance La between the sheet 110 and the color sensor 551 is set to fall within the predetermined range suitable for the light portion 551a of the color sensor 551.

After that, the controller 451 slides the measurement unit 500 in a reading direction RD for the patches P1, and starts measurement of the patches P1 (Step S808). The controller 451 measures the patches P1-1 to P1-n while sliding the measurement unit 500 in the reading direction RD for the patches P1. After completion of the measurement of the patch P1-n, the controller 451 stops the slide movement of the measurement unit 500 to stop the measurement of the patches P1 of the first line (Step S809). FIG. 13B is a view for illustrating a state after the stop of the measurement of the patches P1, which is performed by the measurement unit 500.

After that, the controller 451 raises the raising and lowering unit 550 (Step S810). The controller 451 determines whether or not the measurement of the patches of the last line has been completed (Step S811). When the measurement of the patches of the last line has not been completed (NO in Step S811), the controller 451 conveys the sheet 110 in the conveyance direction CD by a distance between the patch P1 and the patch P2 (predetermined conveyance distance) by the conveyance rollers 408 and 409 corresponding to the conveyance unit (Step S812). FIG. 13C is a view for illustrating a state after the sheet 110 is conveyed by the predetermined conveyance distance between the patch P1 and the patch P2.

After that, the controller 451 lowers the raising and lowering unit 550 (Step S813). The raising and lowering rollers 555 hold the sheet 110 (Step S814). Next, the fixed rollers 554 hold the sheet 110 (Step S815). The controller 451 measures the patches P2-1 to P2-n while sliding the measurement unit 500 in a direction opposite to the reading direction RD for the patches P1 (Step S816). The controller 451 stops the slide movement of the measurement unit 500, and stops the measurement of the patches P2 (Step S817). FIG. 13D is a view for illustrating a state after the completion of the measurement of the patches P2, which is performed by the measurement unit 500.

After that, the controller 451 raises the raising and lowering unit 550 (Step S818), and the processing is returned to Step S811. The processing in Step S811 to Step S818 is repeated until the measurement unit 500 completes the measurement of the patches Pm of the last line. The measurement unit 500 measures the patches P of one line while moving in one direction (reading direction RD), and measures the patches P of a next line while moving in the opposite direction (direction opposite to the reading direction RD). As described above, the measurement unit 500 measures the patches P while reciprocating along the movement directions MD. When the measurement of the patches of the last line has been completed (YES in Step S811), the controller 451 discharges the sheet 110 from the measurement unit 500 (Step S819), and terminates the measurement job (Step S820).

As described above, the measurement unit 500 including the color sensor 551 is movable in the movement directions (main scanning directions) MD. Thus, the measurement unit 500 can measure the plurality of patches P arranged in the movement directions MD. Accordingly, the plurality of patches P can be fully arranged in a width direction and a length direction of the sheet 110, and hence a larger number of patches P can be arranged on the sheet 110. Specifically, the number of sheets needed for the measurement can be reduced. Further, the patches P can be arranged over the entire area of the sheet 110. Thus, in-plane density uniformity of the sheet 110 can be corrected.

The sheet 110 is kept flat by the raising and lowering rollers 555 and the fixed rollers 554, which are provided in the vicinity of the color sensor 551. In this manner, the distance La between the sheet 110 and the color sensor 551 can be set to fall within the range of the predetermined distance (height). As a result, an inexpensive spectral colorimeter having a small depth of focus can be mounted as the color sensor 551 in the measurement unit 500. The color matching accuracy of the spectral colorimeter is higher than color matching accuracy of an RGB sensor such as a CCD. In general, an inexpensive spectral colorimeter has a small depth of focus, and a spectral colorimeter having a large depth of focus is expensive.

Figure 15A:
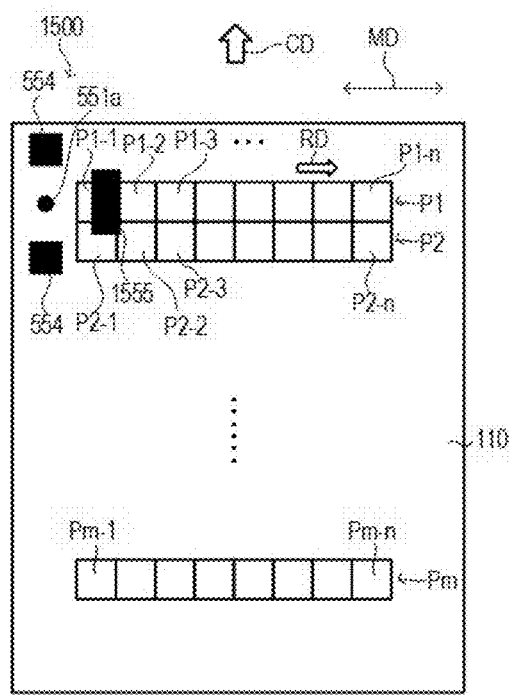
FIG. 15A and FIG. 15B are views for illustrating a positional relationship between a raising and lowering roller and the patches on the sheet in a modification example.
Figure 15B:
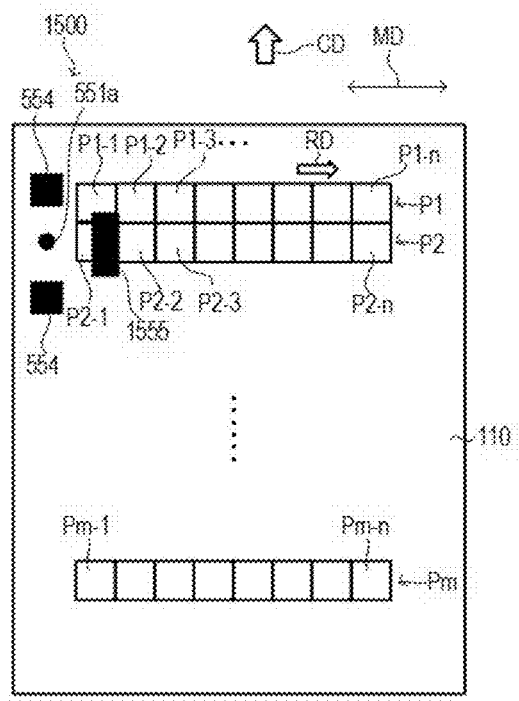

FIG. 15A and FIG. 15B are views for illustrating a positional relationship between a raising and lowering roller 1555 and the patches P on the sheet 110 in a modification example. A measurement unit 1500 of the modification example of this embodiment includes only one raising and lowering roller 1555. The raising and lowering roller 1555 is provided on a downstream side of the light portion 551a in the reading direction RD. Measurement is performed on an upstream side of the raising and lowering roller 1555 while the sheet 110 is being held by the raising and lowering roller 1555. The measurement unit 1500 performs the measurement while being always moved only in one direction (reading direction RD from the left to the right of FIG. 15A and FIG. 15B). If the measurement is performed while the measurement unit 1500 is being moved in the direction opposite to the reading direction RD, the measurement is performed with the light portion 551a on the downstream side of the raising and lowering roller 1555. Thus, the distance between the sheet 110 and the color sensor 551 cannot be set to fall within the range of the predetermined distance. Thus, each time the measurement of the patches P of one line is completed, the measurement unit 1500 is moved in the direction opposite to the reading direction RD. Thus, measurement time is increased.

Figure 16A:
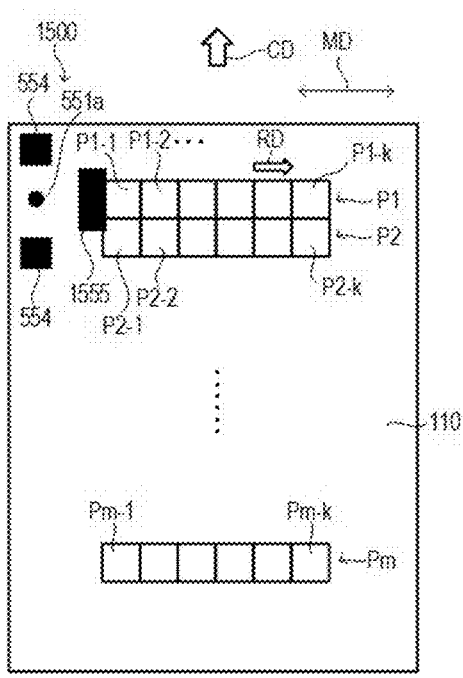
FIG. 16A and FIG. 16B are views for illustrating a positional relationship between the raising and lowering roller and the patches on the sheet in another modification example.
Figure 16B:
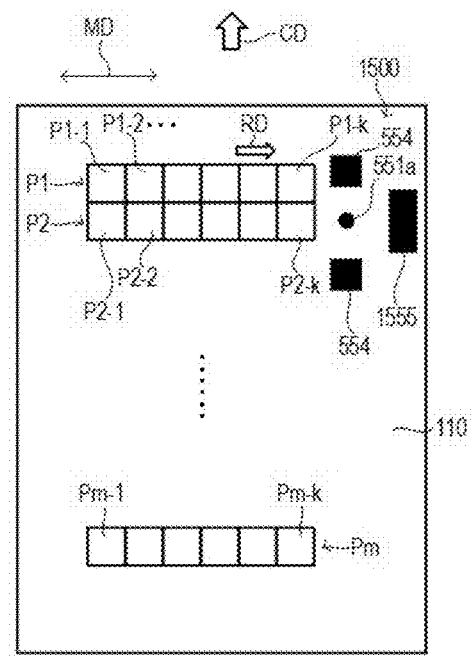

FIG. 16A and FIG. 16B are views for illustrating a positional relationship between the patches P on the sheet 110 and the raising and lowering roller 1555 in another modification example. The measurement unit 1500 of the another modification example of this embodiment also includes only one raising and lowering roller 1555. The patches P at both ends in the movement directions MD are eliminated to shorten the measurement time. The number k of patches P1-1 to P1-$k$ of one line in the movement directions MD is smaller than the number n of patches P1-1 to P1-$n$ of one line in the modification example illustrated in FIG. 15A and FIG. 15B by two or more (k≤n−2). In the another modification example illustrated in FIG. 16A and FIG. 16B, in-plane uniformity of the sheet is reduced due to the reduction in number of the patches P and impossibility of measurement of the ends of the sheet 110 in the movement directions MD.

Thus, the measurement unit 500 of this embodiment includes the raising and lowering rollers 555 provided on the upstream side and the downstream side of the color sensor 551 in the movement directions MD, respectively. With the arrangement of the raising and lowering rollers 555, the measurement can be performed over a large area of the surface of the sheet 110 while the measurement time is shortened. According to this embodiment, in-plane color uniformity of the sheet can be increased to improve the color matching accuracy.

According to this embodiment, the measurement unit 500 can measure the image through the color sensor 551 while holding the sheet 110. As a result, the distance between the sheet 110 and the color sensor 551 can be set to fall within the range of the predetermined distance. Thus, the color sensor 551, which has a small depth of focus and is inexpensive, can be used. Further, the color sensor 551 is moved in the movement directions MD orthogonal to the conveyance direction CD of the sheet 110. Thus, a substantially entire area of the sheet 110 can be measured. Thus, a large number of patches P can be arranged on one sheet 110, and hence the number of sheets 110 needed for the measurement can be reduced. Further, the in-plane uniformity of the substantially entire area of the sheet 110 can be corrected.

According to this embodiment, a change in distance between the sheet 110 and the color sensor 551, which may occur when the color sensor 551 configured to measure the image on the sheet 110 is moved with respect to the sheet 110, can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204660, filed Nov. 12, 2019, which is hereby incorporated by reference herein in its entirety.

What is claimed is:

1. A measurement apparatus, comprising:
   a conveyance roller configured to convey a sheet, on which an image is formed, in a conveyance direction;
   a sensor which includes a light receiving element configured to receive reflected light from the image formed on the sheet, and is configured to measure the image based on a result of light reception by the light receiving element;
   a first drive source configured to move the sensor in a predetermined direction orthogonal to the conveyance direction;
   a second drive source configured to move the sensor to a first position and a second position farther apart from the sheet than the first position;
   a first roller configured to abut against the sheet when the sensor is located at the first position;
   a second roller which is provided at a position different from a position of the first roller in the conveyance direction, and is configured to abut against the sheet when the sensor is located at the first position;
   a third roller configured to abut against the sheet when the sensor is located at the first position; and
   a fourth roller which is provided at a position different from a position of the third roller in the predetermined direction, and is configured to abut against the sheet when the sensor is located at the first position,
   wherein an area in which the light receiving element is provided in the conveyance direction is located between an area in which the first roller is provided and an area in which the second roller is provided in the conveyance direction,
   wherein an area in which the light receiving element is provided in the predetermined direction is located between an area in which the third roller is provided and an area in which the fourth roller is provided in the predetermined direction,
   wherein the area in which the light receiving element is provided in the conveyance direction overlaps with an area in which the third roller is provided in the conveyance direction,
   wherein the area in which the light receiving element is provided in the conveyance direction overlaps with an area in which the fourth roller is provided in the conveyance direction,
   wherein, when the sensor is moved from the second position to the first position by the second drive source, the third roller and the fourth roller are brought into abutment against the sheet earlier than the first roller, and
   wherein, when the sensor is moved from the second position to the first position by the second drive source, the third roller and the fourth roller are brought into abutment against the sheet earlier than the second roller.

2. The measurement apparatus according to claim 1, wherein the area in which the light receiving element is provided in the predetermined direction overlaps with an area in which the first roller is provided in the predetermined direction, and
   wherein the area in which the light receiving element is provided in the predetermined direction overlaps with an area in which the second roller is provided in the predetermined direction.

3. The measurement apparatus according to claim 1, wherein the image includes a first image and a second image formed at a position different from a position of the first image in the conveyance direction, and
wherein the sensor is configured to:
measure the first image while being moved in the predetermined direction by the first drive soruce;
be moved from the first position to the second position by the second drive source;
be moved from the second position to the first position by the second drive source after the sheet is moved in the conveyance direction by the conveyance roller; and
measure the second image while being moved in a direction opposite to the predetermined direction by the first drive source.

4. The measurement apparatus according to claim 1, wherein the sensor further includes a diffraction grating configured to spectrally disperse the reflected light.

5. An image forming apparatus, comprising:
an image former configured to form an image on a sheet;
a conveyance roller configured to convey the sheet to a conveyance path; and
a measurement device provided in the conveyance path, the measurement device comprising:
a sensor which includes a light receiving element configured to receive reflected light from the image formed on the sheet, and is configured to measure the image based on a result of light reception by the light receiving element;
a first drive source configured to move the sensor in a predetermined direction orthogonal to a conveyance direction in which the conveyance roller conveys the sheet;
a second drive source configured to move the sensor to a first position and a second position farther apart from the sheet than the first position;
a first roller configured to abut against the sheet when the sensor is located at the first position;
a second roller which is provided at a position different from a position of the first roller in the conveyance direction, and is configured to abut against the sheet when the sensor is located at the first position;
a third roller configured to abut against the sheet when the measurement portion is located at the first position; and
a fourth roller which is provided at a position different from a position of the third roller in the predetermined direction, and is configured to abut against the sheet when the sensor is located at the first position,
wherein an area in which the light receiving element is provided in the conveyance direction is located between an area in which the first roller is provided and an area in which the second roller is provided in the conveyance direction,
wherein an area in which the light receiving element is provided in the predetermined direction is located between an area in which the third roller is provided and an area in which the fourth roller is provided in the predetermined direction,
wherein the area in which the light receiving elememt is provided in the conveyance direction overlaps with an area in which the third roller is provided in the conveyance direction,
wherein the area in which the light receiving element is provided in the conveyance direction overlaps with an area in which the fourth roller is provided in the conveyance direction,
wherein, when the sensor is moved from the second position to the first position by the second drive source, the third roller and the fourth roller are brought into abutment against the sheet earlier than the first roller, and
wherein, when the sensor is moved from the second position to the first position by the second drive source, the third roller and the fourth roller are brought into abutment against the sheet earlier than the second roller.

6. A measurement apparatus, comprising:
a conveyance roller configured to convey a sheet on which a test image is formed;
a sensor configured to read the test image on the sheet;
a support member configured to support the sensor, the support member being movable in a predetermined direction parallel to a surface of the sheet on which the test image is formed and intersecting with a conveyance direction in which the sheet is conveyed by the conveyance roller, the support member moving in the predetermined direction in order that the sensor reads different regions of the test image on the sheet;
a first roller mounted to the support member;
a second roller mounted to the support member and located opposite to the first roller with respect to the sensor in the conveyance direction; and
a third roller mounted to the support member and located downstream of each of the sensor, the first roller, and the second roller in the predetermined direction, the third roller overlapping with the sensor as viewed in the predetermined direction, wherein in a case in which the sensor reads the test image on the sheet while the support member is moved in the predetermined direction, the first roller, the second roller, and the third roller are brought into abutment against the sheet so that a distance between the sensor and the test image read by the sensor becomes a predetermined distance.

7. The measurement apparatus according to claim 6, further comprising a fourth roller mounted to the support member and located upstream of each of the sensor, the first roller, and the second roller in the predetermined direction,
wherein the support member is further moved in an opposite predetermined direction opposite to the predetermined direction, and
wherein the fourth roller overlaps with the sensor as viewed in the opposite predetermined direction.

8. The measurement apparatus according to claim 6, wherein the third roller is mounted to the support member through an elastic member.

9. The measurement apparatus according to claim 6, further comprising a fourth roller mounted to the support member and located upstream of each of the sensor, the first roller, and the second roller in the predetermined direction,
wherein the support member is further moved in an opposite predetermined direction opposite to the predetermined direction,
wherein the fourth roller overlaps with the sensor as viewed in the opposite predetermined direction, and
wherein each of the third roller and the fourth roller is mounted to the support member through an elastic member.

10. The measurement apparatus according to claim 6, wherein the sensor is located between the first roller and the second roller in the conveyance direction.

11. The measurement apparatus according to claim 6, wherein the predetermined direction is orthogonal to the conveyance direction.

12. An image forming apparatus, comprising:
- an image former configured to form an image on a sheet based on an image forming condition;
- a conveyance roller configured to convey a sheet on which a test image is formed by the image former;
- a sensor configured to read the test image on the sheet;
- a support member configured to support the sensor, the support member being movable in a predetermined direction parallel to a surface of the sheet on which the test image is formed and intersecting with a conveyance direction in which the sheet is conveyed by the conveyance roller, the support member moving in the predetermined direction in order that the sensor reads different regions of the test image on the sheet;
- a first roller mounted to the support member;
- a second roller mounted to the support member and located opposite to the first roller with respect to the sensor in the conveyance direction;
- a third roller mounted to the support member and located downstream of each of the sensor, the first roller, and the second roller in the predetermined direction, the third roller overlapping with the sensor as viewed in the predetermined direction; and
- a controller configured to generate the image forming condition based on a read result of the test image by the sensor,
- wherein in a case in which the sensor reads the test image on the sheet while the support member is moved in the predetermined direction, the first roller, the second roller, and the third roller are brought into abutment against the sheet so that a distance between the sensor and the test image read by the sensor becomes a predetermined distance.

13. The image forming apparatus according to claim 12, wherein the image forming condition is a conversion condition used for converting an input image signal.

14. The image forming apparatus according to claim 13, wherein the conversion condition is a color profile.

15. The image forming apparatus according to claim 12, further comprising a fourth roller mounted to the support member and located upstream of each of the sensor, the first roller, and the second roller in the predetermined direction,
- wherein the support member is further moved in an opposite predetermined direction opposite to the predetermined direction, and
- wherein the fourth roller overlaps with the sensor as viewed in the opposite predetermined direction.

16. The image forming apparatus according to claim 12, wherein the third roller is mounted to the support member through an elastic member.

17. The image forming apparatus according to claim 12, further comprising a fourth roller mounted to the support member and located upstream of each of the sensor, the first roller, and the second roller in the predetermined direction,
- wherein the support member is further moved in an opposite predetermined direction opposite to the predetermined direction,
- wherein the fourth roller overlaps with the sensor as viewed in the opposite predetermined direction, and
- wherein each of the third roller and the fourth roller is mounted to the support member through an elastic member.

18. The image forming apparatus according to claim 12, wherein the sensor is located between the first roller and the second roller in the conveyance direction.

19. The image forming apparatus according to claim 12, wherein the predetermined direction is orthogonal to the conveyance direction.

* * * * *